US010959268B2

(12) United States Patent
Islam et al.

(10) Patent No.: US 10,959,268 B2
(45) Date of Patent: Mar. 23, 2021

(54) RANDOM ACCESS TIMELINE AND TIMING ADJUSTMENT TECHNIQUES

(71) Applicant: QUALCOMM Incorporated, San Diego, CA (US)

(72) Inventors: Muhammad Nazmul Islam, Littleton, MA (US); Sumeeth Nagaraja, San Diego, CA (US); Amir Aminzadeh Gohari, Sunnyvale, CA (US); Awlok Josan, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/250,801

(22) Filed: Jan. 17, 2019

(65) Prior Publication Data

US 2019/0261422 A1 Aug. 22, 2019

Related U.S. Application Data

(60) Provisional application No. 62/710,485, filed on Feb. 16, 2018.

(51) Int. Cl.
*H04W 74/08* (2009.01)
*H04L 27/26* (2006.01)
(Continued)

(52) U.S. Cl.
CPC ....... *H04W 74/0833* (2013.01); *H04L 5/0053* (2013.01); *H04L 5/0092* (2013.01);
(Continued)

(58) Field of Classification Search
CPC ........... H04W 74/006; H04W 74/0833; H04W 5/0053; H04W 56/0055; H04W 56/001;
(Continued)

(56) References Cited

U.S. PATENT DOCUMENTS 8,804,630 B2 * 8/2014 Ito .................... H04W 74/002
370/329
8,842,567 B2 * 9/2014 Lee .................... H04W 4/70
370/252
(Continued)

FOREIGN PATENT DOCUMENTS

AU 2017304162 A1 2/2019
CA 3027284 A1 12/2017
(Continued)

OTHER PUBLICATIONS

Partial International Search Report—PCT/US2019/014486—ISA/EPO—dated Apr. 11, 2019 (18189WO).
(Continued)

*Primary Examiner* — Man U Phan
(74) *Attorney, Agent, or Firm* — Holland & Hart LLP

(57) ABSTRACT

Methods, systems, and devices for wireless communications for determining a minimum time gap between an received downlink message and transmission of an uplink message in response to the received downlink message. In some cases, a user equipment (UE) may receive a downlink message to perform a random access procedure. The UE may determine a minimum time gap based on an uplink transmission preparation time. The UE may transmit a random access preamble based on the minimum time gap. In some examples, the UE may receive a timing advance (TA) command and may determine a minimum time gap between receipt of the TA command and transmission of a time-adjusted uplink message.

19 Claims, 14 Drawing Sheets

(51) Int. Cl.
*H04W 56/00* (2009.01)
*H04L 5/00* (2006.01)
*H04W 74/00* (2009.01)

(52) U.S. Cl.
CPC ....... *H04L 27/2666* (2013.01); *H04W 56/001* (2013.01); *H04W 56/0045* (2013.01); *H04W 56/0055* (2013.01); *H04W 74/006* (2013.01)

(58) Field of Classification Search
CPC . H04W 56/0045; H04W 74/08; H04W 56/00; H04L 5/0053; H04L 5/0092; H04L 27/2666; H04L 27/26
USPC ........................................................ 370/329
See application file for complete search history.

(56) References Cited

U.S. PATENT DOCUMENTS

| | | | | |
|---|---|---|---|---|
| 9,037,177 | B2* | 5/2015 | Ohta | H04W 72/0413 |
| | | | | 455/509 |
| 9,585,188 | B2* | 2/2017 | Jang | H04W 56/005 |
| 9,867,191 | B2* | 1/2018 | Wong | H04L 5/0007 |
| 10,433,343 | B2* | 10/2019 | Chen | H04W 72/10 |
| 10,602,492 | B2* | 3/2020 | Jang | H04W 52/50 |
| 2017/0367110 | A1 | 12/2017 | Li et al. | |
| 2018/0035470 | A1* | 2/2018 | Chen | H04W 48/16 |
| 2018/0098298 | A1* | 4/2018 | Jung | H04L 5/0048 |
| 2019/0037606 | A1* | 1/2019 | Takeda | H04W 72/005 |
| 2019/0223224 | A1* | 7/2019 | Park | H04W 74/0833 |
| 2020/0053677 | A1* | 2/2020 | Tiirola | H04W 56/003 |
| 2020/0107348 | A1* | 4/2020 | Park | H04W 72/1268 |

FOREIGN PATENT DOCUMENTS

| | | |
|---|---|---|
| WO | WO-2017088898 A1 | 6/2017 |
| WO | WO-2018021867 A1 | 2/2018 |

OTHER PUBLICATIONS

Huawei, et al., "Remaining Issues in RACH Procedure", 3GPP TSG RAN WG1 meeting #91, 3GPP Draft; R1-1719374, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017 (Nov. 18, 2017), pp. 1-11, XP051369283, Retrieved from the Internet: URL: http://www.3gpp.org/ftp/tsg%5Fran/wg1%5Frl1/tsgr1%5F91/Docs/ [retrieved on Nov. 18, 2017] Section 4.2.
International Search Report and Written Opinion—PCT/US2019/014486—ISA/EPO—dated Jul. 12, 2019 (182189WO).
NOKIA., et al., "Scheduling Framework and Requirements", 3GPP TSG-RAN WG2 Meeting #94, R2-163445, Discussion and Decision, Nanjing, China, May 23-27, 2016, 4 pages.

* cited by examiner

RANDOM ACCESS TIMELINE AND TIMING ADJUSTMENT TECHNIQUES

CROSS REFERENCE

The present application for patent claims the benefit of U.S. Provisional Patent Application No. 62/710,485 by Islam et al., entitled "RANDOM ACCESS TIMELINE AND TIMING ADJUSTMENT TECHNIQUES," filed Feb. 16, 2018, assigned to the assignee hereof, and expressly incorporated by reference herein in its entirety.

BACKGROUND

The following relates generally to wireless communications, and more specifically to random access timeline and timing adjustment techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In wireless communications systems, a base station may transmit a downlink transmission to a UE and in response, the UE may transmit an uplink transmission. The UE may experience delays related to processing the downlink transmission and preparing the uplink transmission for transmission to the base station. These delays may vary based on UE capability, transmission types, amount of data received or transmitted, etc. In systems employing multiple numerologies, the time gap between a received downlink transmission may be fixed based on a number of symbols or slots. However, the symbol duration and the slot duration may vary based on the numerology.

SUMMARY

The described techniques relate to improved methods, systems, devices, or apparatuses that support random access timeline and timing adjustment techniques. Generally, the described techniques provide for determining a minimum time gap between a downlink transmission and an uplink transmission. A minimum time gap between a downlink transmission and an uplink transmission may be specified based on a downlink decoding time, an uplink transmission preparation time, or a higher layer processing latency, each of which may depend on a numerology. Numerology may refer to a given subcarrier spacing (SCS) (i.e., the bandwidth between each tone or subcarrier in the frequency domain), symbol duration (i.e., the time interval designated as a single time resource), number of tones within a carrier (i.e., the number of subcarriers spanning a given component carrier (CC) for wireless communication), the number of symbols spanning a frame, subframe, slot, mini-slot, or any other time interval of the wireless network. In some cases, the minimum time gap between reception of a physical downlink control channel (PDCCH) order and transmission of a random access channel (RACH) preamble (e.g., Msg1) may be determined or calculated based on one or more numerologies. In other examples, the minimum time gap between reception of a timing advance (TA) command and a time-adjusted uplink transmission in response to the TA command may be determined or calculated based on one or more numerologies.

A method of wireless communications is described. The method may include receiving, from a base station, a control channel message including an indication to perform a random access procedure, determining a minimum time gap for transmission of a random access preamble based at least in part on an uplink transmission preparation time, and transmitting the random access preamble to the base station in response to the control channel message based at least in part on the minimum time gap.

An apparatus for wireless communications is described. The apparatus may include means for receiving, from a base station, a control channel message including an indication to perform a random access procedure, means for determining a minimum time gap for transmission of a random access preamble based at least in part on an uplink transmission preparation time, and means for transmitting the random access preamble to the base station in response to the control channel message based at least in part on the minimum time gap.

Another apparatus for wireless communications is described. The apparatus may include a processor, memory in electronic communication with the processor, and instructions stored in the memory. The instructions may be operable to cause the processor to receive, from a base station, a control channel message including an indication to perform a random access procedure, determine a minimum time gap for transmission of a random access preamble based at least in part on an uplink transmission preparation time, and transmit the random access preamble to the base station in response to the control channel message based at least in part on the minimum time gap.

A non-transitory computer-readable medium for wireless communications is described. The non-transitory computer-readable medium may include instructions operable to cause a processor to receive, from a base station, a control channel message including an indication to perform a random access procedure, determine a minimum time gap for transmission of a random access preamble based at least in part on an uplink transmission preparation time, and transmit the random access preamble to the base station in response to the control channel message based at least in part on the minimum time gap.

Some examples of the method, apparatus, and non-transitory computer-readable medium described above may further include processes, features, means, or instructions for determining the minimum time gap based solely on the uplink transmission preparation time.

Some examples of the method, apparatus, and non-transitory computer-readable medium described above may further include processes, features, means, or instructions for determining the minimum time gap based at least in part on a downlink transmission decoding time, a layer 2 processing time, or a combination thereof, and calculating the downlink transmission decoding time based at least in part on a numerology associated with the control channel message, a numerology associated with data in a downlink bandwidth part of the control channel message, a numerology for the minimum time gap configured by a higher layer, or a default numerology.

Some examples of the method, apparatus, and non-transitory computer-readable medium described above may further include processes, features, means, or instructions for calculating the uplink transmission preparation time based at least in part on a numerology associated with the random access preamble, a numerology associated with data in an uplink bandwidth part of a channel used for the random access preamble, a numerology for the minimum time gap configured by a higher layer, or a default numerology.

In some examples of the method, apparatus, and non-transitory computer-readable medium described above, the default numerology may be associated with an SCS of 15 kilohertz (kHz). In some aspects, the default numerology may be band specific.

Some examples of the method, apparatus, and non-transitory computer-readable medium described above may further include processes, features, means, or instructions for determining that a transmission numerology for the random access preamble may be undefined for calculation of the uplink transmission preparation time. Some examples of the method, apparatus, and non-transitory computer-readable medium described above may further include processes, features, means, or instructions for selecting the default numerology for calculating the uplink transmission preparation time based at least in part on determining that the transmission numerology for the random access preamble may be undefined.

Some examples of the method, apparatus, and non-transitory computer-readable medium described above may further include processes, features, means, or instructions for identifying a first number of symbols based at least in part on a first numerology associated with the downlink transmission decoding time. Some examples of the method, apparatus, and non-transitory computer-readable medium described above may further include processes, features, means, or instructions for identifying a second number of symbols based at least in part on a second numerology associated with the uplink transmission preparation time. Some examples of the method, apparatus, and non-transitory computer-readable medium described above may further include processes, features, means, or instructions for determining the minimum time gap based at least in part on a minimum of the first number of symbols and the second number of symbols.

Some examples of the method, apparatus, and non-transitory computer-readable medium described above may further include processes, features, means, or instructions for identifying a first time duration based at least in part on a first numerology associated with the downlink transmission decoding time. Some examples of the method, apparatus, and non-transitory computer-readable medium described above may further include processes, features, means, or instructions for identifying a second time duration based at least in part on a second numerology associated with the uplink transmission preparation time. Some examples of the method, apparatus, and non-transitory computer-readable medium described above may further include processes, features, means, or instructions for determining the minimum time gap based at least in part on a maximum of the first time duration and the second time duration.

Some examples of the method, apparatus, and non-transitory computer-readable medium described above may further include processes, features, means, or instructions for determining the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

Some examples of the method, apparatus, and non-transitory computer-readable medium described above may further include processes, features, means, or instructions for receiving, from the base station, a message indicating a number of symbols corresponding to at least one of the downlink transmission decoding time, the uplink transmission preparation time, the layer 2 processing time, or a combination thereof.

Some examples of the method, apparatus, and non-transitory computer-readable medium described above may further include processes, features, means, or instructions for transmitting the random access preamble to the base station after the minimum time gap.

In some examples of the method, apparatus, and non-transitory computer-readable medium described above, the layer 2 processing time may be associated with a medium access control (MAC) latency time.

In some examples of the method, apparatus, and non-transitory computer-readable medium described above, the control channel message may include a PDCCH order.

A method of wireless communications is described. The method may include receiving, from a base station, a control channel message including an indication to perform a random access procedure, determining a minimum time gap for transmission of a random access preamble based at least in part on a first numerology, and transmitting the random access preamble to the base station in response to the control channel message based at least in part on the minimum time gap, where the random access preamble is transmitted with a second numerology different from the first numerology.

An apparatus for wireless communications is described. The apparatus may include means for receiving, from a base station, a control channel message including an indication to perform a random access procedure, means for determining a minimum time gap for transmission of a random access preamble based at least in part on a first numerology, and means for transmitting the random access preamble to the base station in response to the control channel message based at least in part on the minimum time gap, where the random access preamble is transmitted with a second numerology different from the first numerology.

Another apparatus for wireless communications is described. The apparatus may include a processor, memory in electronic communication with the processor, and instructions stored in the memory. The instructions may be operable to cause the processor to receive, from a base station, a control channel message including an indication to perform a random access procedure, determine a minimum time gap for transmission of a random access preamble based at least in part on a first numerology, and transmit the random access preamble to the base station in response to the control channel message based at least in part on the minimum time gap, where the random access preamble is transmitted with a second numerology different from the first numerology.

A non-transitory computer-readable medium for wireless communications is described. The non-transitory computer-readable medium may include instructions operable to cause a processor to receive, from a base station, a control channel message including an indication to perform a random access procedure, determine a minimum time gap for transmission of a random access preamble based at least in part on a first numerology, and transmit the random access preamble to the base station in response to the control channel message based at least in part on the minimum time gap, where the random access preamble is transmitted with a second numerology different from the first numerology.

Some examples of the method, apparatus, and non-transitory computer-readable medium described above may further include processes, features, means, or instructions for receiving the control channel message according to the first numerology corresponding to a first SCS that may be different from a second SCS associated with the second numerology.

In some examples of the method, apparatus, and non-transitory computer-readable medium described above, the second numerology may be configured by a higher layer.

In some examples of the method, apparatus, and non-transitory computer-readable medium described above, the second numerology may be a default numerology.

In some examples of the method, apparatus, and non-transitory computer-readable medium described above, the default numerology may be associated with an SCS of 15 kHz. In some aspects, the default numerology may be band specific.

In some examples of the method, apparatus, and non-transitory computer-readable medium described above, the control channel message may include a PDCCH order.

A method of wireless communications is described. The method may include receiving, from a base station, a downlink message that indicates a TA command, determining a minimum time gap for transmission of a time-adjusted uplink message based at least in part on a downlink transmission decoding time, an uplink transmission preparation time, or a combination thereof, and transmitting the time-adjusted uplink message to the base station in response to the TA command based at least in part on the minimum time gap.

An apparatus for wireless communications is described. The apparatus may include means for receiving, from a base station, a downlink message that indicates a TA command, means for determining a minimum time gap for transmission of a time-adjusted uplink message based at least in part on a downlink transmission decoding time, an uplink transmission preparation time, or a combination thereof, and means for transmitting the time-adjusted uplink message to the base station in response to the TA command based at least in part on the minimum time gap.

Another apparatus for wireless communications is described. The apparatus may include a processor, memory in electronic communication with the processor, and instructions stored in the memory. The instructions may be operable to cause the processor to receive, from a base station, a downlink message that indicates a TA command, determine a minimum time gap for transmission of a time-adjusted uplink message based at least in part on a downlink transmission decoding time, an uplink transmission preparation time, or a combination thereof, and transmit the time-adjusted uplink message to the base station in response to the TA command based at least in part on the minimum time gap.

A non-transitory computer-readable medium for wireless communications is described. The non-transitory computer-readable medium may include instructions operable to cause a processor to receive, from a base station, a downlink message that indicates a TA command, determine a minimum time gap for transmission of a time-adjusted uplink message based at least in part on a downlink transmission decoding time, an uplink transmission preparation time, or a combination thereof, and transmit the time-adjusted uplink message to the base station in response to the TA command based at least in part on the minimum time gap.

Some examples of the method, apparatus, and non-transitory computer-readable medium described above may further include processes, features, means, or instructions for determining the minimum time gap based at least in part on a summation of the downlink transmission decoding time, the uplink transmission preparation time, and a layer 2 processing time, or a combination thereof.

Some examples of the method, apparatus, and non-transitory computer-readable medium described above may further include processes, features, means, or instructions for calculating the downlink transmission decoding time based at least in part on a numerology associated with the downlink message, a numerology associated with data in a downlink bandwidth part of the downlink message, or a numerology for the minimum time gap configured by a higher layer.

Some examples of the method, apparatus, and non-transitory computer-readable medium described above may further include processes, features, means, or instructions for calculating the uplink transmission preparation time based at least in part on a numerology associated with the time-adjusted uplink message, a numerology associated with data in an uplink bandwidth part of a channel used for the time-adjusted uplink message, or a numerology for the minimum time gap configured by a higher layer.

Some examples of the method, apparatus, and non-transitory computer-readable medium described above may further include processes, features, means, or instructions for identifying a first number of symbols based at least in part on a first numerology associated with the downlink transmission decoding time. Some examples of the method, apparatus, and non-transitory computer-readable medium described above may further include processes, features, means, or instructions for identifying a second number of symbols based at least in part on a second numerology associated with the uplink transmission preparation time. Some examples of the method, apparatus, and non-transitory computer-readable medium described above may further include processes, features, means, or instructions for determining the minimum time gap based at least in part on a minimum of the first number of symbols and the second number of symbols.

Some examples of the method, apparatus, and non-transitory computer-readable medium described above may further include processes, features, means, or instructions for identifying a first time duration based at least in part on a first numerology associated with the downlink transmission decoding time. Some examples of the method, apparatus, and non-transitory computer-readable medium described above may further include processes, features, means, or instructions for identifying a second time duration based at least in part on a second numerology associated with the uplink transmission preparation time. Some examples of the method, apparatus, and non-transitory computer-readable medium described above may further include processes, features, means, or instructions for determining the minimum time gap based at least in part on a maximum of the first time duration and the second time duration. Some examples of the method, apparatus, and non-transitory computer-readable medium described above may further include processes, features, means, or instructions for determining the minimum time gap based at least in part on a minimum of the first time duration and the second time duration.

Some examples of the method, apparatus, and non-transitory computer-readable medium described above may further include processes, features, means, or instructions for determining the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or a layer 2 processing time.

Some examples of the method, apparatus, and non-transitory computer-readable medium described above may further include processes, features, means, or instructions for transmitting the time-adjusted uplink message to the base station after the minimum time gap.

Some examples of the method, apparatus, and non-transitory computer-readable medium described above may further include processes, features, means, or instructions for transmitting an uplink message according to a previous time adjustment during the minimum time gap.

Some examples of the method, apparatus, and non-transitory computer-readable medium described above may further include processes, features, means, or instructions for receiving, from the base station, a message indicating a number of symbols corresponding to at least one of the downlink transmission decoding time, the uplink transmission preparation time, a layer 2 processing time, or a combination thereof.

In some examples of the method, apparatus, and non-transitory computer-readable medium described above, the downlink message may comprise a MAC control element (MAC-CE) that conveys the TA command.

Some examples of the method, apparatus, and non-transitory computer-readable medium described above may further include processes, features, means, or instructions for receiving the downlink message via a physical downlink shared channel (PDSCH).

DETAILED DESCRIPTION

Figure 1:
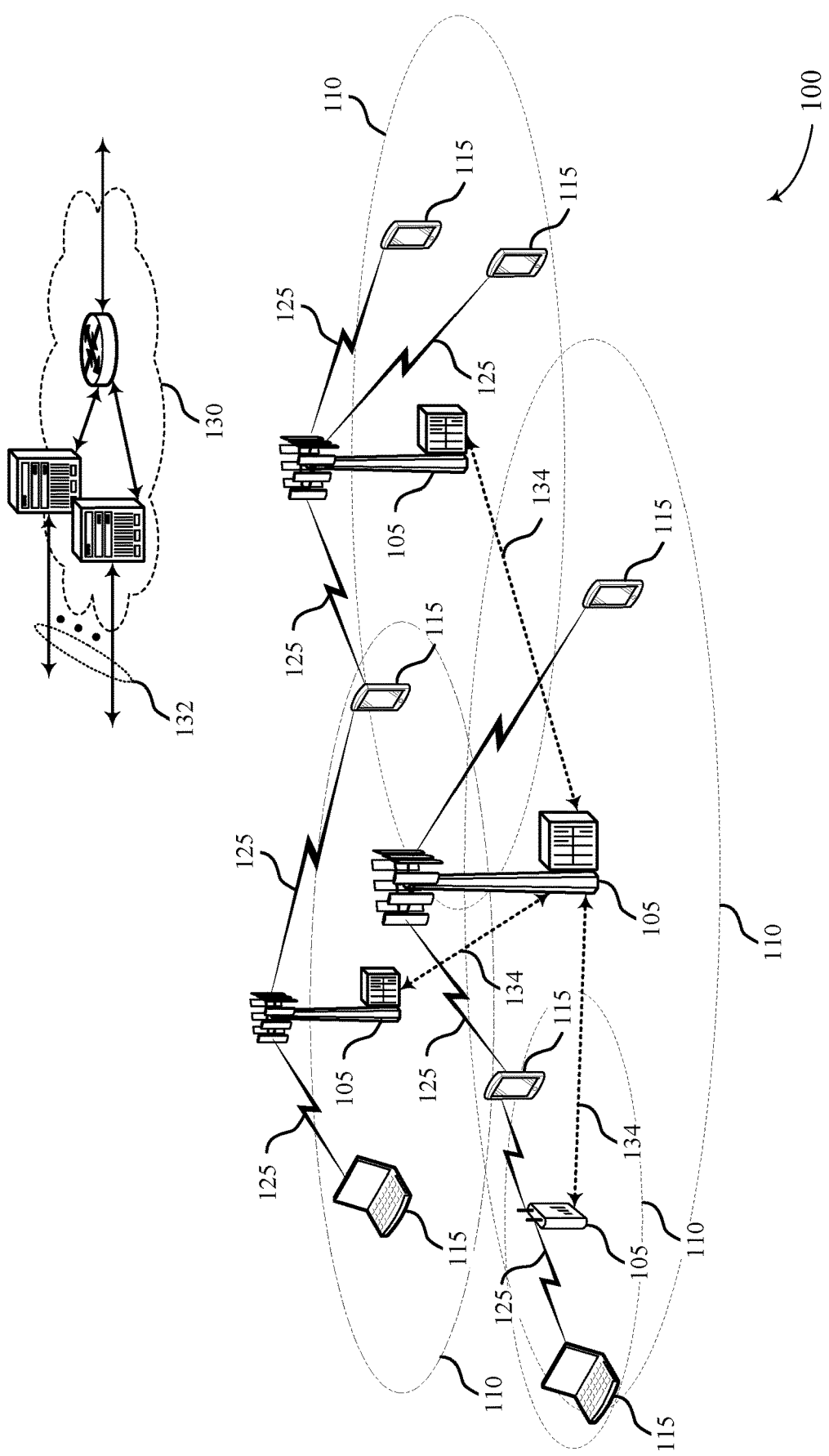
FIG. 1 illustrates an example of a wireless communications system that supports random access timeline and timing adjustment techniques in accordance with aspects of the present disclosure.

Various described techniques provide for determining a minimum time gap between a downlink transmission and an uplink response transmission. In some cases, the minimum time gap may be determined by a user equipment (UE) so as to allow the UE enough time to process the downlink transmission and generate the uplink transmission in response to the downlink transmission. The duration of the minimum time gap may be based on a downlink decoding time (N1), an uplink transmission preparation time (N2), or a higher layer processing latency (L2), each of which may depend on a numerology. In some examples, the downlink transmission may be a transmission on physical downlink control channel (PDCCH) that orders a UE to start a random access channel (RACH) procedure (i.e., PDCCH order). In such a case, the uplink response transmission may be a RACH preamble (e.g., Msg1), and the UE may wait a minimum time gap to process the RACH order and generate the RACH preamble. In other examples, the downlink transmission may be a timing advance (TA) command. A UE may adjust its uplink transmission timing based on the TA command to align the uplink transmission timings at a base station. In such a case, the UE may wait a minimum time gap before applying the TA command to uplink transmissions.

In some examples, N1 may be based on a numerology associated with PDCCH, a numerology associated with the downlink bandwidth part where PDCCH is received, any numerology configured by a higher layer solely to determine the minimum time gap, or any default numerology (e.g., a numerology associated with a 15 kilohertz (kHz) subcarrier spacing (SCS)). In some cases, N2 may be defined based on a numerology associated with a RACH preamble, a numerology associated with the uplink bandwidth part where a physical RACH (PRACH) is transmitted, any numerology configured by a higher layer solely to determine the minimum time gap, or any default numerology (e.g., a numerology associated with a 15 kHz SCS). In some examples, N1 and N2 may be associated with a numerology for which N1 and N2 are not defined (e.g., a numerology associated with a 1.25 kHz SCS or a 5 kHz SCS). In such a case, N1 and N2 may be defined according to a default numerology (e.g., a numerology associated with a 15 kHz SCS). In some instances, L2 may be defined according to a numerology associated with a higher layer processing latency. L2 may have a fixed duration across all numerologies (e.g., 0.5 milliseconds (ms)).

The minimum time gap may be based on N1, N2, and L2. For example, the minimum time gap may be the duration of N1 only, the duration of N2 only, the duration of N1+N2, the duration of N1+N2+L2, or the maximum value (e.g., in absolute time) of N1 and N2.

Aspects of the disclosure are initially described in the context of a wireless communications system. Aspects of the disclosure are then illustrated through examples of transmission timing and process flows. Aspects of the disclosure are further illustrated by and described with reference to apparatus diagrams, system diagrams, and flowcharts that relate to random access timeline and timing adjustment techniques.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations 105). The UEs 115 described herein may be able to communicate with various types of base stations 105 and network equipment including macro eNBs, small cell eNBs, gNBs, relay base stations 105, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and ANCs) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 ms, where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the SCS or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may transmit a downlink message to a UE 115, and the UE 115 may transmit an uplink transmission in response. In order to process the downlink message and generate the uplink message, the UE 115 may wait a minimum time gap. A minimum time gap between a downlink transmission and an uplink transmission may be specified based on a downlink decoding time, an uplink transmission preparation time, and a higher layer processing latency, each of which may depend on a numerology. Numerology may refer to a given SCS (i.e., the bandwidth between each tone or subcarrier in the frequency domain), symbol duration (i.e., the time interval designated as a single time resource), number of tones within a carrier (i.e., the number of subcarriers spanning a given CC for wireless communication), the number of symbols spanning a frame, subframe, slot, mini-slot, or any other time interval of the wireless network.

Figure 2:
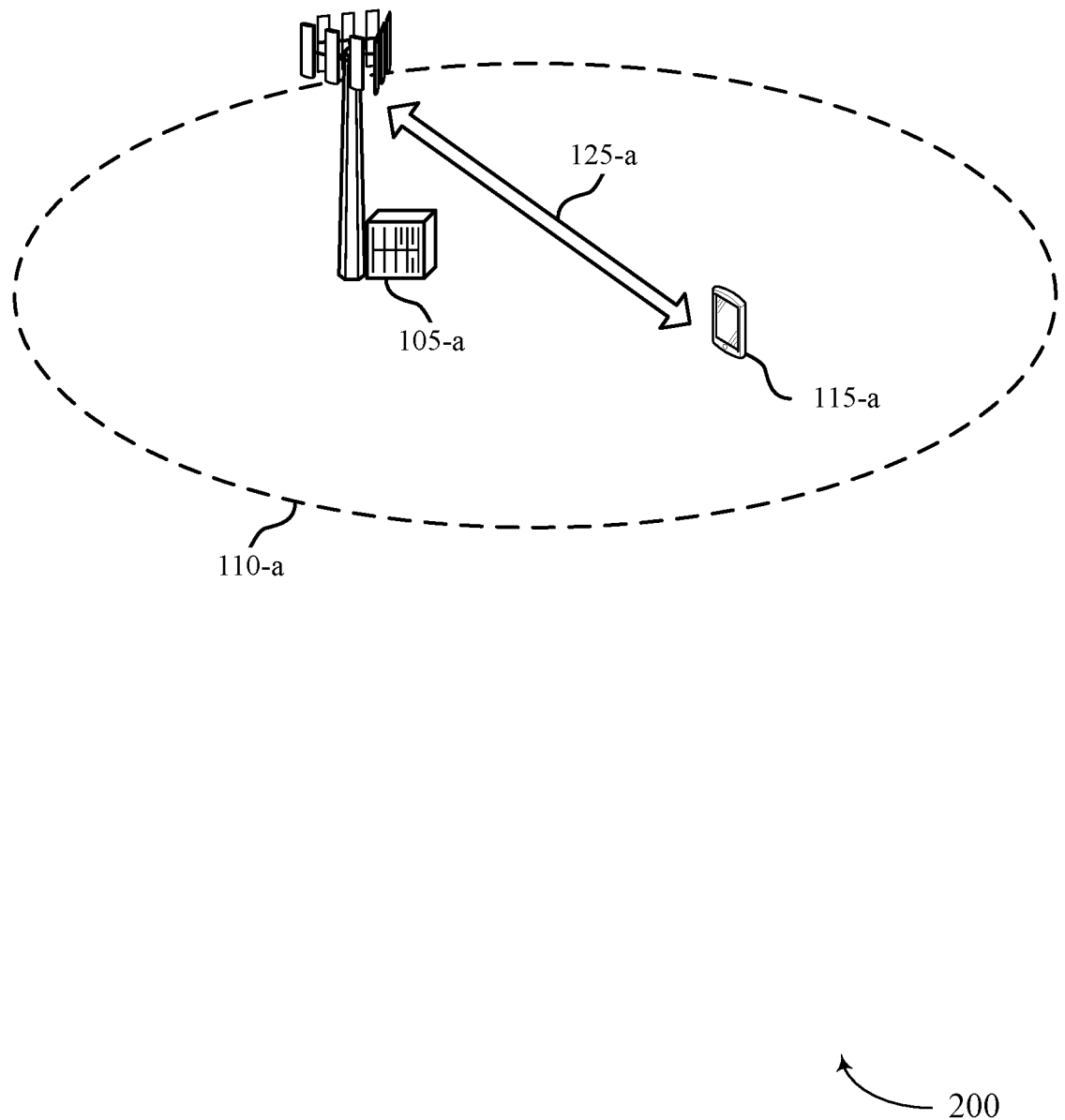
FIG. 2 illustrates an example of a wireless communications system that supports random access timeline and timing adjustment techniques in accordance with aspects of the present disclosure.

FIG. 2 illustrates an example of a wireless communications system 200 that supports random access timeline and timing adjustment techniques in accordance with various aspects of the present disclosure. In some examples, wireless communications system 200 may implement aspects of wireless communications system 100. Wireless communications system 200 includes a base station 105-a supporting communication with a UE 115-a within coverage area 110-a. Base station 105-a and UE 115-a may be examples of the corresponding devices described with reference to FIG. 1.

In some examples, base station 105-a and UE 115-a may exchange messages (e.g., data, control, RACH messages) over communication link 125-a. Base station 105-a may perform a downlink transmission that prompts an uplink transmission by UE 115-a in response to the downlink message. In such cases, UE 115-a may wait a minimum time gap before performing the uplink transmission in response to the downlink transmission, which may allow UE 115-a to process the downlink transmission and generate the uplink transmission. According to some aspects, the duration of the minimum time gap may depend on a downlink decoding time (N1), an uplink transmission preparation time (N2), or a higher layer processing time (L2), each of which may depend on a data numerology. For example, wireless communications system 200 may be an NR system that supports multiple numerologies for wireless communication. In some cases, a numerology associated with a higher SCS (e.g., 30 kHz, 60 kHz, 120 kHz, 240 kHz, or 480 kHz) may be associated with a shorter slot duration. In such cases, the minimum time gap may utilize a higher number of slots during various portions of the RACH procedure when compared to a numerology associated with a lower tone spacing (e.g., 7.5 kHz, 15 kHz).

In some examples, the numerology for a given downlink decoding time N1 or uplink transmission preparation time N2 may be selected by base station 105-a and the numerology may be the same for all UEs 115 (e.g., UE 115-a) attempting to perform an uplink transmission to base station 105-a in response to a downlink transmission by base station 105-a. In other examples, the numerology for a downlink decoding time N1 or an uplink transmission preparation time N2 may be UE-specific. For instance, the numerology for an uplink transmission preparation time at UE 115-a may be selected based on capabilities of the UE 115-a or channel conditions. In some examples, the numerology for a given downlink decoding time N1 or uplink transmission preparation time N2 may be determined by UE 115-a.

In some examples, aspects of the minimum time gap (e.g., the duration determined by N1, N2, and L2) may be determined in accordance with a required timing of base station 105-a, UE 115-a, or both. The minimum time gap, N1, N2, and L2 may be expressed in terms of absolute time without correlation to the numerology selected by base station 105-a. In some cases, the minimum time gap, N1, N2, or L2 may be indicated to the UE 115-a (e.g., from base station 105-a) via a random access response message (e.g., a random access response (RAR) grant transmitted via PDCCH, a RAR payload transmitted via a physical downlink shared channel (PDSCH)) or via control or system information (e.g., PDCCH signaling, master information block (MIB) within physical broadcast channel (PBCH), minimum system information block (MSIR), remaining system information (RMSI), or one or more system information blocks (SIBs)). Values associated with the minimum time gap may be indicated explicitly to UE 115-a via transmission by the base station 105-a. In other cases, base station 105-a and UE 115-a may determine values associated with the minimum time gap a priori in accordance with protocols of wireless communications system 200 (e.g., Standards protocols). In yet other examples, UE 115-a may determine the minimum time gap based on N1, N2, and L2.

In some cases, the minimum time gap is determined based on N1, N2, and L2. For example, the minimum time gap may be the duration of N1 only, the duration of N2 only, the duration of N1+N2, the duration of N1+N2+L2, or the maximum value (e.g., in absolute time) of N1 and N2

Figure 3:
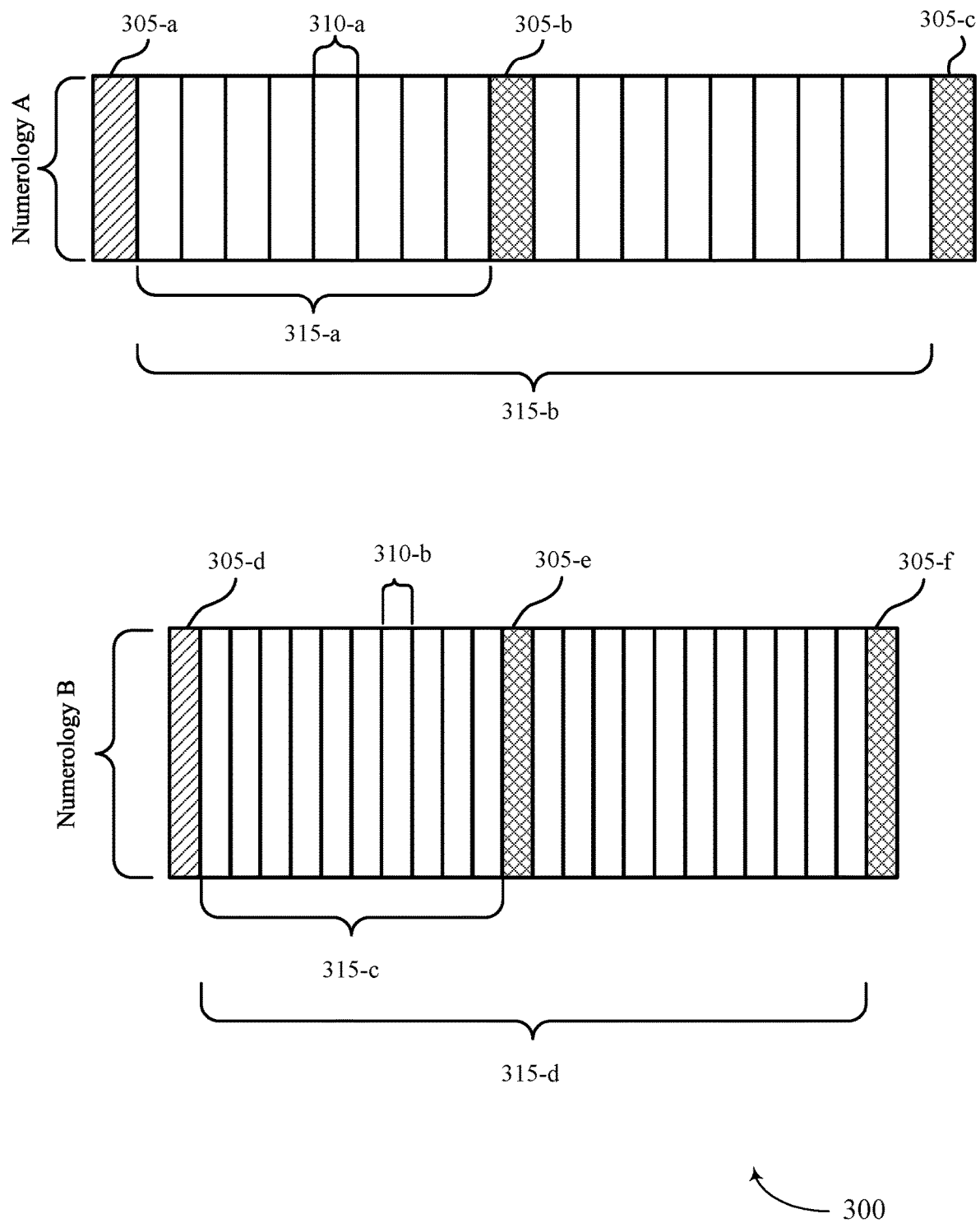
FIG. 3 illustrates an example of a transmission timing that supports random access timeline and timing adjustment techniques in accordance with aspects of the present disclosure.

FIG. 3 illustrates an example of a transmission timing 300 that supports random access timeline and timing adjustment techniques in accordance with various aspects of the present disclosure. In some examples, transmission timing 300 may implement aspects of wireless communications system 100 and 200 as described with reference to FIGS. 1 and 2.

Transmission timing 300 may depend on Numerology A or Numerology B, each shown having multiple symbols 305 associated with a given symbol duration 310. An indication of transmission timing 300 may be transmitted by a base station 105 to a UE 115. The indication may convey a number of slots or symbols to use in determining the minimum time gap between the base station 105 and the UE 115. In some examples, the UE 115 may determine transmission timing 300 (e.g., based on N1, N2, L2, or any combination thereof).

In some examples, a base station 105 may transmit a downlink message via PDCCH which orders a UE 115 to start a RACH procedure (i.e., PDCCH order). In such a case, the UE 115 may wait a minimum time gap 315 before transmitting a RACH message so that the UE 115 is able to process the PDCCH order and generate the RACH message. The UE 115 may determine minimum time gap 315 based on downlink decoding time N1, uplink transmission preparation time N2, and higher layer processing time L2, each of which may depend on a data numerology. After waiting the minimum time gap 315, the UE 115 may transmit a RACH message (e.g., Msg1) to the base station 105. The RACH message may include a RACH preamble, which may be included in a PRACH signal, and a random access radio network temporary identity (RA-RNTI) associated with the UE 115.

For example, a base station 105 may transmit a PDCCH order during symbol 305-*a* to a UE 115. The UE 115 may wait a minimum time gap 315-*a* before transmitting a RACH preamble in symbol 305-*b*. The minimum time gap 315-*a* may be based on N1, N2, and L2, each of which may depend on a numerology. In some cases, N1 may be defined with respect to a first data numerology. For instance, N1 may be defined based on a numerology associated with PDCCH, a numerology associated with the downlink bandwidth part where PDCCH is received, any numerology configured by a higher layer solely to determine the minimum time gap, or any default numerology (e.g., a numerology associated with a 15 kHz SCS). As an example, N1 may be associated with Numerology A of transmission timing 300, where the length of N1 may be based on Tables 1 and 2 below, where Tables 1 and 2 correspond to a first and a second processing capability of a UE 115, respectively:

TABLE 1

| $\mu_{DL}$ | N1 [symbols] | |
|---|---|---|
| | No Additional DM-RS Configured | Additional DM-RS Configured |
| 0 | 8 | 13 |
| 1 | 10 | 13 |
| 2 | 17 | 20 |
| 3 | 20 | 24 |

TABLE 2

| $\mu_{DL}$ | N1 [symbols] | |
|---|---|---|
| | No Additional DM-RS Configured | Additional DM-RS Configured |
| 0 | [2.5-4] | [12] |
| 1 | [2.5-6] | [12] |

Similarly, N2 may be defined with respect to the first numerology. For instance, N2 may be defined based on a numerology associated with a RACH preamble, a numerology associated with the uplink bandwidth part where PRACH is transmitted, any numerology configured by a higher layer solely to determine the minimum time gap, or any default numerology (e.g., a numerology associated with a 15 kHz SCS). As an example, N2 may be associated with Numerology A of transmission timing 300, where the length of N2 may be based on Tables 3 and 4 below, where Tables 3 and 4 correspond to a first and a second processing capability of a UE 115, respectively:

TABLE 3

| $\mu_{DL}$ | N2 [symbols] |
|---|---|
| 0 | 10 |
| 1 | 12 |
| 2 | 23 |
| 3 | 36 |

TABLE 4

| $\mu_{DL}$ | N2 [symbols] |
|---|---|
| 0 | [2.5-6] |
| 1 | [2.5-6] |

In Tables 1-4, the SCS corresponding to Numerology A may be found by multiplying a base SCS (e.g., 15 kHz) by $2^{\mu_{DL}}$. For example, transmission timing 300 may utilize a first numerology (e.g., Numerology A) that corresponds to $\mu DL=0$ such that the SCS is 15 kHz (15 kHz*2°), and the UE 115 may have first processing capability that defines N1 according to Table 1 and N2 according to Table 3. In such a case, the downlink decoding time N1 may be 8 symbols in length, as shown in Table 1, when no additional demodulation reference signal (DMRS) is needed. Similarly, uplink transmission preparation time N2 may be 10 symbols, as shown in Table 3.

In some examples, N1 and N2 may be defined according to a second numerology (e.g., Numerology B) corresponding to $\mu_{DL}=1$ such that the SCS is 30 kHz (15 kHz*$2^1$), and the UE 115 may have a first processing capability that defines N1 according to Table 1 and N2 according to Table 3. In such a case, the symbol duration 310 associated with the second numerology (e.g., symbol duration 310-*b*) may be shorter than the symbol duration associated with the first numerology (e.g., symbol duration 310-*a*), thus resulting in the UE 115 requiring more symbols 305 to decode a downlink transmission (e.g., a PDCCH order) and prepare uplink transmission (e.g., a RACH preamble). Thus, as shown in Tables 1 and 3, respectively, N1 may be 10 symbols in duration and N2 may be 12 symbols in duration.

In some cases, N1 and/or N2 may correspond to a numerology for which N1 and/or N2 are not defined (e.g., a numerology associated with a 1.25 kHz SCS or a 5 kHz SCS). In such cases, N1 or N2 may be defined according to a default numerology (e.g., a numerology associated with a 15 kHz SCS). The default numerology may be band specific. For example, the default numerology may be a numerology associated with a 15 kHz SCS when the UE 115 operates in a sub-6 GHz frequency spectrum band, and the default numerology may be a numerology associated with a 60 kHz SCS when the UE 115 operates in an over-6 GHz frequency spectrum band.

In some examples, L2 may be defined according to the processing latency associated with decoding higher layer signaling (e.g., MAC layer). In other examples, L2 may have a fixed duration in absolute time (e.g., 0.5 ms) such that L2 has the same duration for all numerologies.

In some examples, the UE 115 may determine a minimum time gap 315 based on N1, N2, and L2. For example, a minimum time gap 315 may be the same duration as N1 only. As described above, N1 may be associated with Numerology A such that N1 is 8 symbols long. Thus, the resulting a minimum time gap 315-*a* may separate a PDCCH order received in symbol 305-*a* with a RACH preamble transmitted in symbol 305-*b* by 8 symbols. Further, a minimum time gap may be the same duration as N1+N2, for example. As described above, N1 and N2 may be associated with Numerology A such that N1 is 8 symbols in length and N2 is 10 symbols in length. Thus, the resulting minimum time gap 315-*b* may separate a PDCCH order received in symbol 305-*a* with a RACH preamble transmitted in symbol 305-*c* by 18 symbols.

As described above, N1 may be associated with Numerology B such that N1 is 10 symbols long. Thus, when a minimum time gap is defined as being the same length as N1 only, the resulting minimum time gap 315-c may separate a PDCCH order received in symbol 305-d with a RACH preamble transmitted in symbol 305-e by 10 symbols. Further, a minimum time gap may be the same duration as N1+N2, for example. As described above, N1 and N2 may be associated with Numerology B such that N1 is 10 symbols in length and N2 is 12 symbols in length. Thus, the resulting minimum time gap 315-d may separate a PDCCH order received in symbol 305-d with a RACH preamble transmitted in symbol 305-f by 22 symbols.

In some examples, the minimum time gap 315 may be defined as the maximum (or minimum) time duration of N1 and N2. N1 and N2 may correspond to the same numerology (e.g., Numerology A). As described above, N1 may have a length of 8 symbols, and N2 may have a length of 10 symbols when N1 and N2 correspond to Numerology A. Because N1 and N2 both correspond to Numerology A, each symbol 305 of N1 and N2 will have the same symbol duration 310-a. In such a case, because N2 has more symbols than N1, and thus a longer duration in time, a minimum time gap 315 may be defined as the same length as N2 (e.g., 10 symbols), thus separating a PDCCH order and RACH preamble by 10 symbols. In other examples, N1 and N2 may correspond to different numerologies (e.g., Numerology A and Numerology B). In such a case, N1 and N2 may be defined based on the numerology corresponding to the lowest SCS (and, thus, the longest symbol duration 310). As described above, N1 may correspond to a first numerology (e.g., Numerology A) and N2 may correspond to a second numerology (e.g., Numerology B), where the second numerology corresponds to a higher SCS than the first numerology. In such a case, a UE 115 may determine to define N1 and N2 based on the first numerology, which may maximize the time duration of N1 and N2. In doing so, the UE 115 may utilize a minimum time gap 315, which is based on N1 and N2, that will have a long enough duration to account for processing delays and transmission preparation times. Further, each of N1 and N2 may be defined based on different numerologies. In such a case, a UE 115 may decide to define N1 and N2 based on the numerology corresponding to the lowest SCS, thus ensuring that N1 and N2 may be long enough in duration to account for processing delays and transmission preparation time.

In some examples, the minimum time gap may be determined based on a first SCS associated with a first numerology (e.g., Numerology A) and the RACH preamble may be transmitted with a second SCS associated with a second numerology (e.g., Numerology B).

In some examples, a base station 105 may send a downlink transmission that contains a TA command to a UE 115, where the TA command may adjust the uplink transmission timing at the UE 115 to align with the transmission timing at the base station 105. The TA command may be conveyed in a MAC-CE, which may be included in PDSCH. The UE 115 may wait a minimum time gap 315 before applying the TA command to uplink transmissions. The length of the minimum time gap 315 may be based on N1, N2, and L2, each of which may be determined in a similar manner as described above.

For example, a UE 115 may determine the length of N1 according to Table 1 and length of N2 according to Table 3. In such an example, when associated with a given numerology (e.g., Numerology A), N1 and N2 may be defined as 8 and 10 symbols in length, respectively. A minimum time gap 315 may have the same length as N1+N2, for example, which may result in a minimum time gap 315 of 18 symbols (e.g., minimum time gap 315-c). In such a case, the UE 115 may apply the TA command to uplink transmissions that are transmitted at or after symbol 305-c, which is 18 symbols (i.e., the duration of the minimum time gap 315-c) after the downlink transmission carrying the TA command is received (e.g., at symbol 305-a). Prior to the end of the minimum time gap, the UE 115 may still send uplink transmissions to the base station 105, but these uplink transmissions may not be adjusted according to the TA command received from the base station 105.

Figure 4:
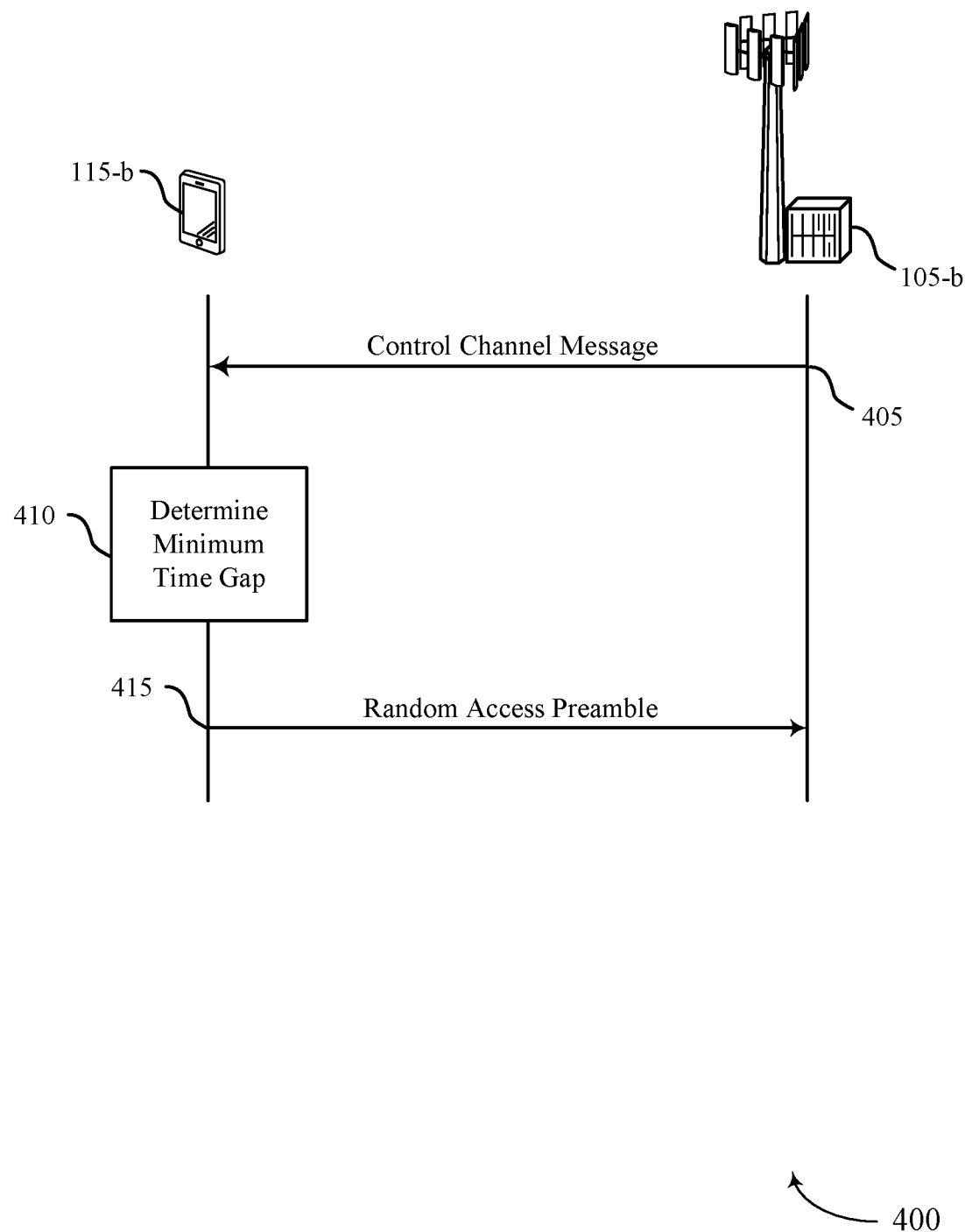
FIG. 4 illustrates an example of a process flow that supports random access timeline and timing adjustment techniques in accordance with aspects of the present disclosure.

FIG. 4 illustrates an example of a process flow 400 that supports random access timeline and timing adjustment techniques in accordance with various aspects of the present disclosure. In some examples, process flow 400 may implement aspects of wireless communications systems 100 and 200 with reference to FIGS. 1 and 2.

At 405, base station 105-b may transmit, to UE 115-b, a control channel message including an indication to perform a random access procedure. In some cases, the control channel message may include a PDCCH order.

In some examples, UE 115-b may receive the control channel message according to a first numerology corresponding to a first SCS that is different from a second SCS associated with a second numerology. The second numerology may be configured by a higher layer. In some cases, the second numerology is a default numerology. The default numerology may be associated with an SCS of 15 kHz. In some cases, the default numerology may be band specific.

At 410, UE 115-b may determine a minimum time gap for transmission of a random access preamble based at least in part on a downlink transmission decoding time, an uplink transmission preparation time, a layer 2 processing time, or a combination thereof. UE 115-b may determine the minimum time gap based solely on the uplink transmission preparation time.

In some examples, UE 115-b may calculate the downlink transmission decoding time based at least in part on a numerology associated with the control channel message, a numerology associated with data in a downlink bandwidth part of the control channel message, a numerology for the minimum time gap configured by a higher layer, or a default numerology. The default numerology may be associated with an SCS of 15 kHz.

In some cases, UE 115-b may calculate the uplink transmission preparation time based at least in part on a numerology associated with the random access preamble, a numerology associated with data in an uplink bandwidth part of a channel used for the random access preamble, a numerology for the minimum time gap configured by a higher layer, or a default numerology. The default numerology may be associated with an SCS of 15 kHz.

In some examples, the layer 2 processing time may be associated with a MAC latency time.

In some cases, UE 115-b may determine that a transmission numerology for the random access preamble is undefined for calculation of the uplink transmission preparation time. In such cases, UE 115-b may select the default numerology for calculating the uplink transmission preparation time based at least in part on determining that the transmission numerology for the random access preamble is undefined. In some cases, the default numerology may be band specific.

In some cases, UE 115-b may receive, from base station 105-b, a message indicating a number of symbols corresponding to at least one of the downlink transmission decoding time, the uplink transmission preparation time, the layer 2 processing time, or a combination thereof.

In some examples, UE 115-b may identify a first number of symbols based at least in part on a first numerology associated with the downlink transmission decoding time and a second number of symbols based at least in part on a second numerology associated with the uplink transmission preparation time. UE 115-b may determine the minimum time gap based at least in part on a minimum of the first number of symbols and the second number of symbols.

In some cases, UE 115-b may determine the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

At 415, UE 115-b may transmit the random access preamble to the base station 105-b in response to the control channel message based at least in part on the minimum time gap. In some examples, UE 115-b may transmit the random access preamble to the base station 105-b after the minimum time gap.

In some examples, the minimum time gap, downlink transmission decoding time, uplink transmission preparation time, and layer 2 processing time may be based at least in part on a first numerology. In such cases, the random access preamble may be transmitted with a second numerology different from the first numerology.

Figure 5:
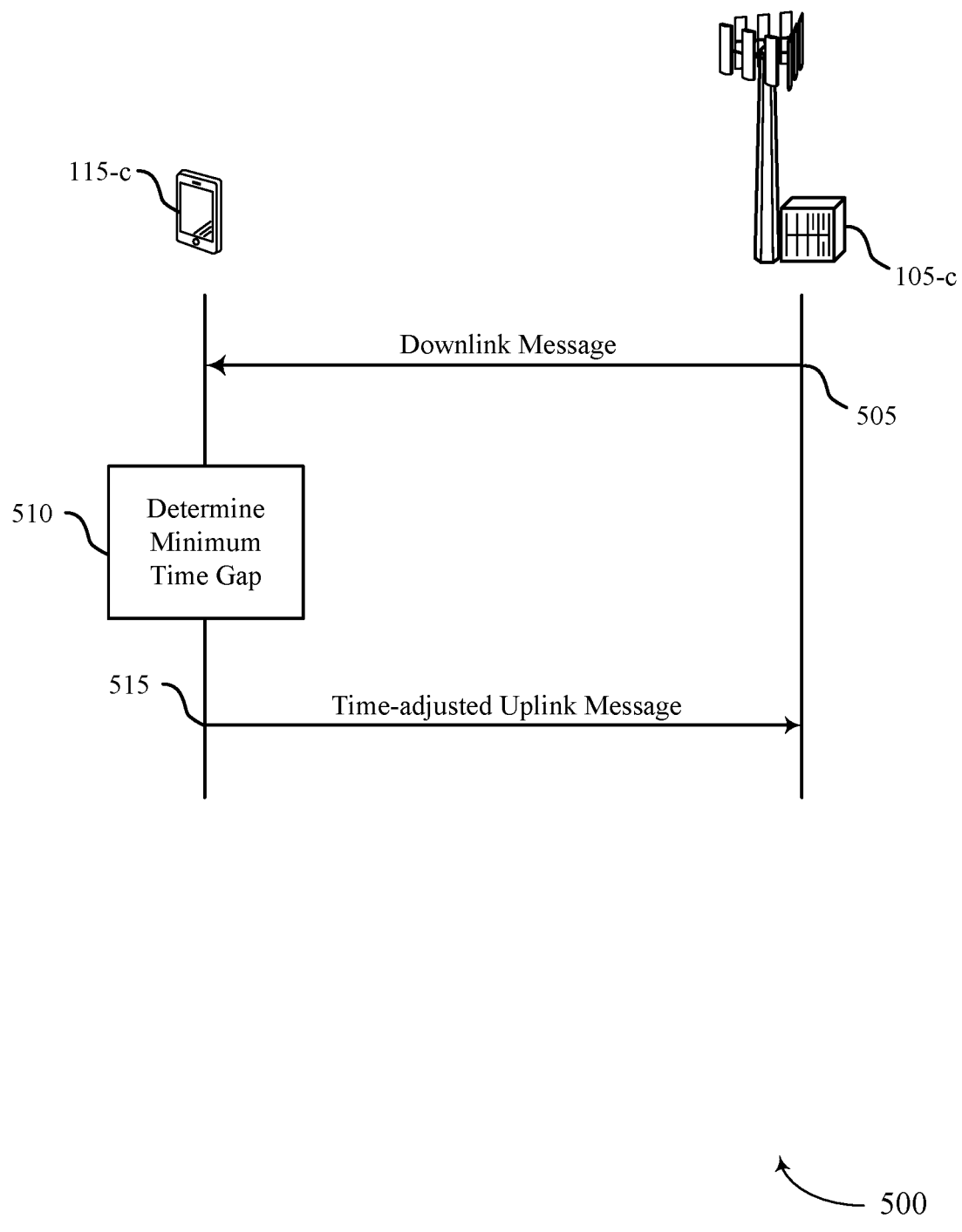
FIG. 5 illustrates an example of a process flow that supports random access timeline and timing adjustment techniques in accordance with aspects of the present disclosure.

FIG. 5 illustrates an example of a process flow 500 that supports random access timeline and timing adjustment techniques in accordance with various aspects of the present disclosure. In some examples, process flow 500 may implement aspects of wireless communications systems 100 and 200 with reference to FIGS. 1 and 2.

At 505, base station 105-c may transmit, to UE 115-c, a downlink message that indicates a TA command. In some examples, the downlink message may include a medium access control MAC-CE that conveys the TA command. The downlink message may be transmitted via a PDSCH.

At 510, UE 115-c may determine a minimum time gap for transmission of a time-adjusted uplink message based at least in part on a downlink transmission decoding time, an uplink transmission preparation time, a layer 2 processing time, or a combination thereof. UE 115-c may determine the minimum time gap based at least in part on a summation of the downlink transmission decoding time, the uplink transmission preparation time, and the layer 2 processing time.

In some cases, UE 115-c may calculate the downlink transmission decoding time based at least in part on a numerology associated with the downlink message, a numerology associated with data in a downlink bandwidth part of the downlink message, a numerology for the minimum time gap configured by a higher layer, or a default numerology. The default numerology may be associated with an SCS of 15 kHz.

In some examples, UE 115-c may calculate the uplink transmission preparation time based at least in part on a numerology associated with the time-adjusted uplink message, a numerology associated with data in an uplink bandwidth part of a channel used for the time-adjusted uplink message, or a numerology for the minimum time gap configured by a higher layer.

In some examples, UE 115-c may identify a first number of symbols based at least in part on a first numerology associated with the downlink transmission decoding time and a second number of symbols based at least in part on a second numerology associated with the uplink transmission preparation time. UE 115-c may determine the minimum time gap based at least in part on a minimum of the first number of symbols and the second number of symbols.

In some cases, UE 115-c may receive, from base station 105-c, a message indicating a number of symbols corresponding to at least one of the downlink transmission decoding time, the uplink transmission preparation time, the layer 2 processing time, or a combination thereof.

In some cases, UE 115-c may determine the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

At 515, UE 115-c may transmit the time-adjusted uplink message to the base station 105-c in response to the TA command based at least in part on the minimum time gap. UE 115-c may transmit the time-adjusted uplink message to the base station after the minimum time gap.

In some cases, UE 115-c may transmit an uplink message according to a previous time adjustment during the minimum time gap.

In some examples, the minimum time gap, downlink transmission decoding time, uplink transmission preparation time, and layer 2 processing time may be based at least in part on a first numerology. In such cases, the time-adjusted transmission may be transmitted with a second numerology different from the first numerology.

Figure 6:
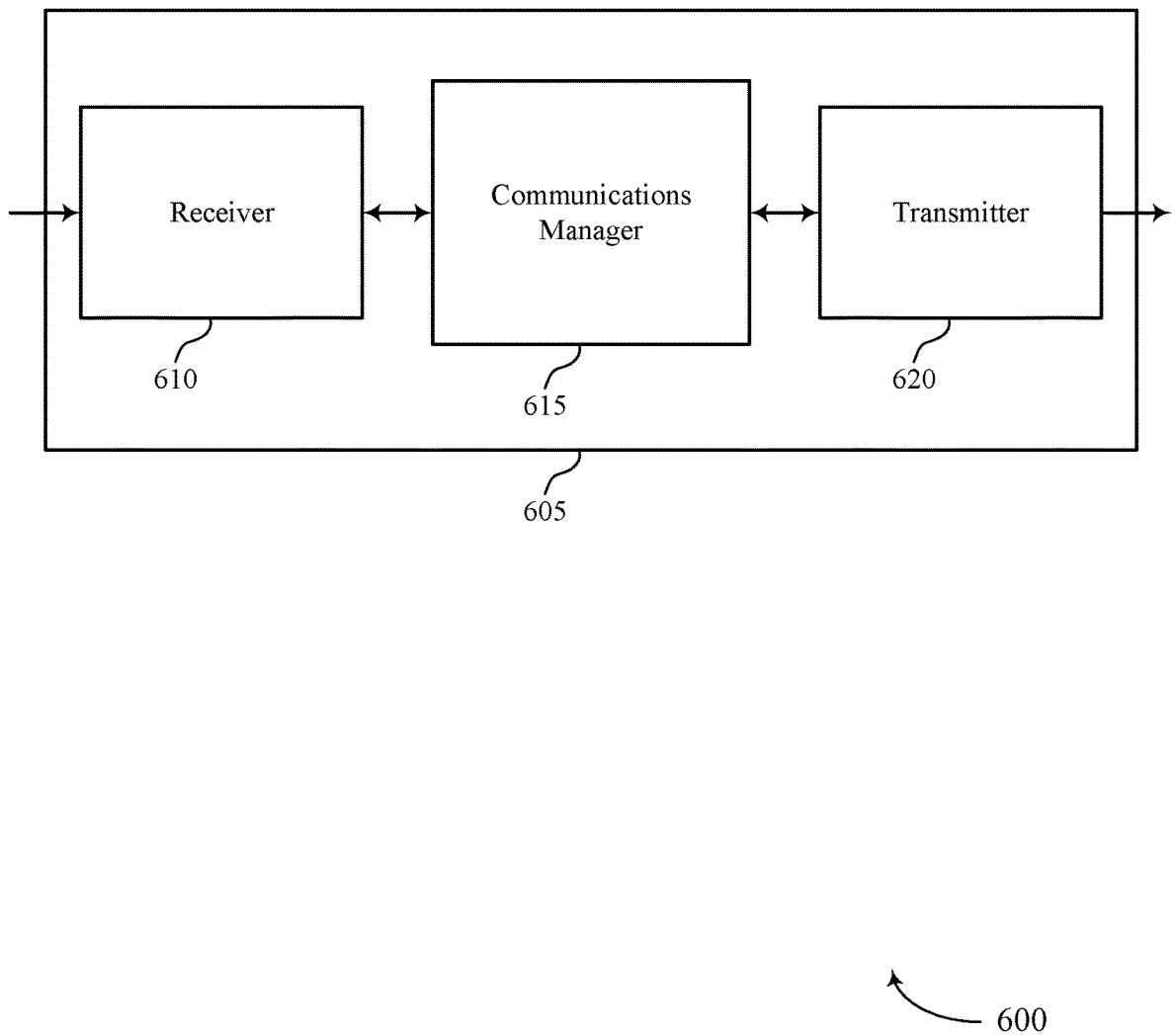
FIGS. 6 through 8 show block diagrams of a device that supports random access timeline and timing adjustment techniques in accordance with aspects of the present disclosure.

FIG. 6 shows a block diagram 600 of a device 605 that supports random access timeline and timing adjustment techniques in accordance with aspects of the present disclosure. Device 605 may be an example of aspects of a UE 115 as described herein. Device 605 may include receiver 610, communications manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to random access timeline and timing adjustment techniques, etc.). Information may be passed on to other components of the device 605. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9. Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 615 may receive, from a base station 105, a control channel message including an indication to perform a random access procedure, determine a minimum time gap for transmission of a random access preamble based on a downlink transmission decoding time, an uplink transmission preparation time, a layer 2 processing time, or a combination thereof, and transmit the random access preamble to the base station 105 in response to the control channel message based on the minimum time gap. In some cases, communications manager 615 may determine a minimum time gap for transmission of a random access preamble based on an uplink transmission preparation time.

The communications manager 615 may also receive, from a base station 105, a control channel message including an indication to perform a random access procedure, determine a minimum time gap for transmission of a random access preamble based on a first numerology, and transmit the random access preamble to the base station 105 in response to the control channel message based on the minimum time gap, where the random access preamble is transmitted with a second numerology different from the first numerology. The communications manager 615 may also receive, from a base station 105, a downlink message that indicates a TA command, determine a minimum time gap for transmission of a time-adjusted uplink message based on a downlink transmission decoding time, an uplink transmission preparation time, a layer 2 processing time, or a combination thereof, and transmit the time-adjusted uplink message to the base station 105 in response to the TA command based on the minimum time gap. In some cases, communications manager 615 may determine the minimum time gap for transmission of a time-adjusted uplink message based on a downlink transmission decoding time, an uplink transmission preparation time, or a combination thereof.

Transmitter 620 may transmit signals generated by other components of the device 605. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
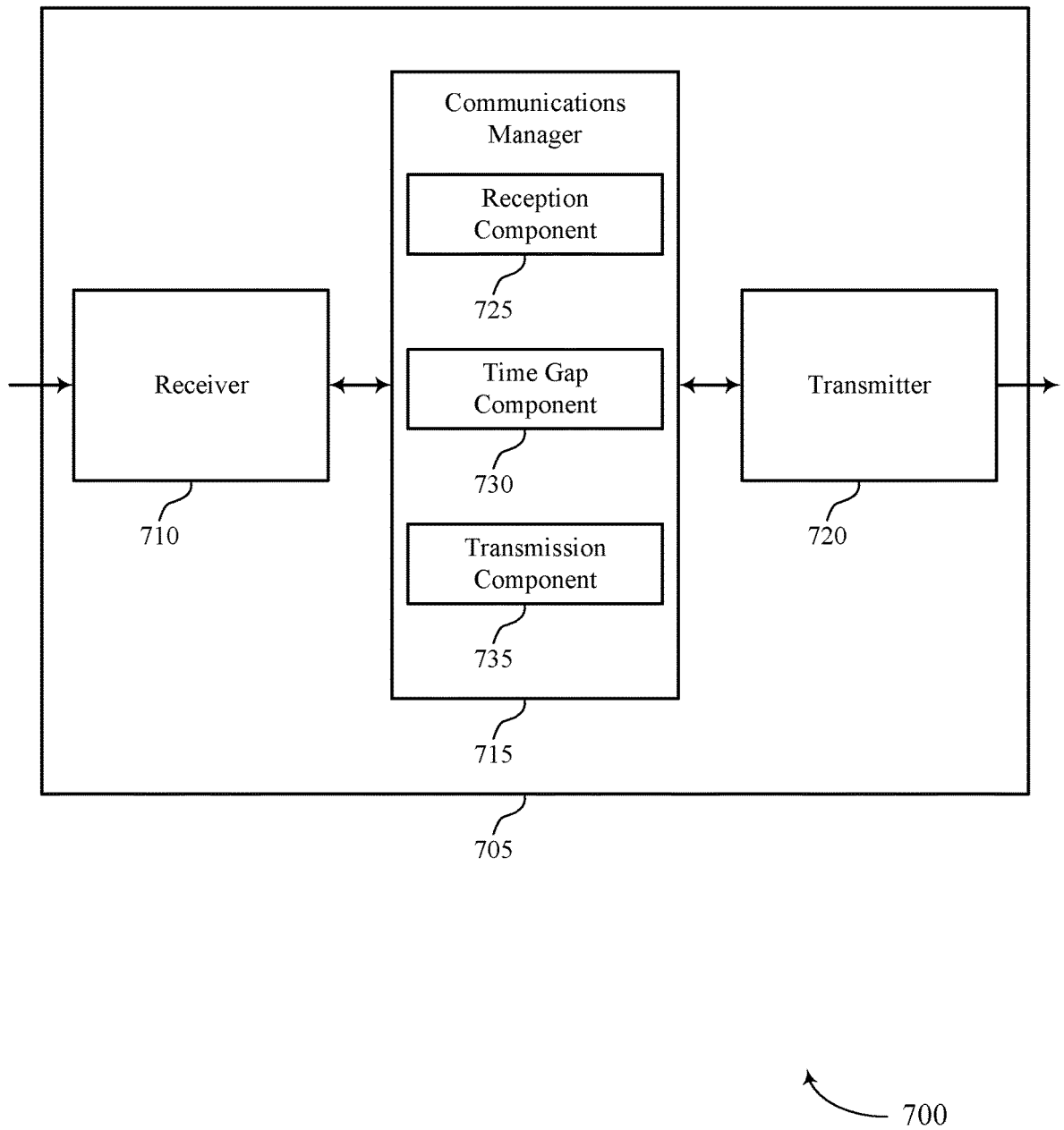

FIG. 7 shows a block diagram 700 of a device 705 that supports random access timeline and timing adjustment techniques in accordance with aspects of the present disclosure. Device 705 may be an example of aspects of a device 605 or a UE 115 as described with reference to FIG. 6. Device 705 may include receiver 710, communications manager 715, and transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to random access timeline and timing adjustment techniques, etc.). Information may be passed on to other components of the device 705. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include reception component 725, time gap component 730, and transmission component 735.

Reception component 725 may receive, from a base station 105, a control channel message including an indication to perform a random access procedure, receive, from the base station 105, a message indicating a number of symbols corresponding to at least one of the downlink transmission decoding time, the uplink transmission preparation time, the layer 2 processing time, or a combination thereof. Reception component 725 may receive the control channel message according to the first numerology corresponding to a first SCS that is different from a second SCS associated with the second numerology. Reception component 725 may receive, from a base station 105, a downlink message that indicates a TA command, and receive the downlink message via a PDSCH. In some cases, the control channel message includes a PDCCH order. In some aspects, the downlink message includes a MAC-CE that conveys the TA command.

Time gap component 730 may determine a minimum time gap for transmission of a random access preamble based on a downlink transmission decoding time, an uplink transmission preparation time, a layer 2 processing time, or a combination thereof. In some cases, time gap component 730 may determine a minimum time gap for transmission of a random access preamble based on an uplink transmission preparation time. Time gap component 730 may determine the minimum time gap based on a numerology and a number of symbols associated with the random access preamble. Time gap component 730 may determine the minimum time gap based on a minimum of the first number of symbols and the second number of symbols. Time gap component 730 may determine the minimum time gap based on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

Time gap component 730 may determine a minimum time gap for transmission of a random access preamble based on a first numerology, determine a minimum time gap for transmission of a time-adjusted uplink message based on a downlink transmission decoding time, an uplink transmission preparation time, a layer 2 processing time, or a combination thereof and determine the minimum time gap based on a summation of the downlink transmission decoding time, the uplink transmission preparation time, and the layer 2 processing time. In some cases, the layer 2 processing time is associated with a MAC latency time.

Transmission component 735 may transmit the random access preamble to the base station 105 in response to the control channel message based on the minimum time gap and transmit the random access preamble to the base station 105 after the minimum time gap. Transmission component 735 may transmit the random access preamble to the base station 105 in response to the control channel message based on the minimum time gap, where the random access preamble is transmitted with a second numerology different from the first numerology. Transmission component 735 may transmit the time-adjusted uplink message to the base station 105 in response to the TA command based on the minimum time gap. Transmission component 735 may transmit the time-adjusted uplink message to the base station 105 after the minimum time gap and transmit an uplink message according to a previous time adjustment during the minimum time gap. In some cases, the second numerology is configured by a higher layer. In some examples, the second numerology is a default numerology. In some aspects, the default numerology is associated with an SCS of 15 kHz. In some aspects, the default numerology is band specific.

Transmitter 720 may transmit signals generated by other components of the device 705. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
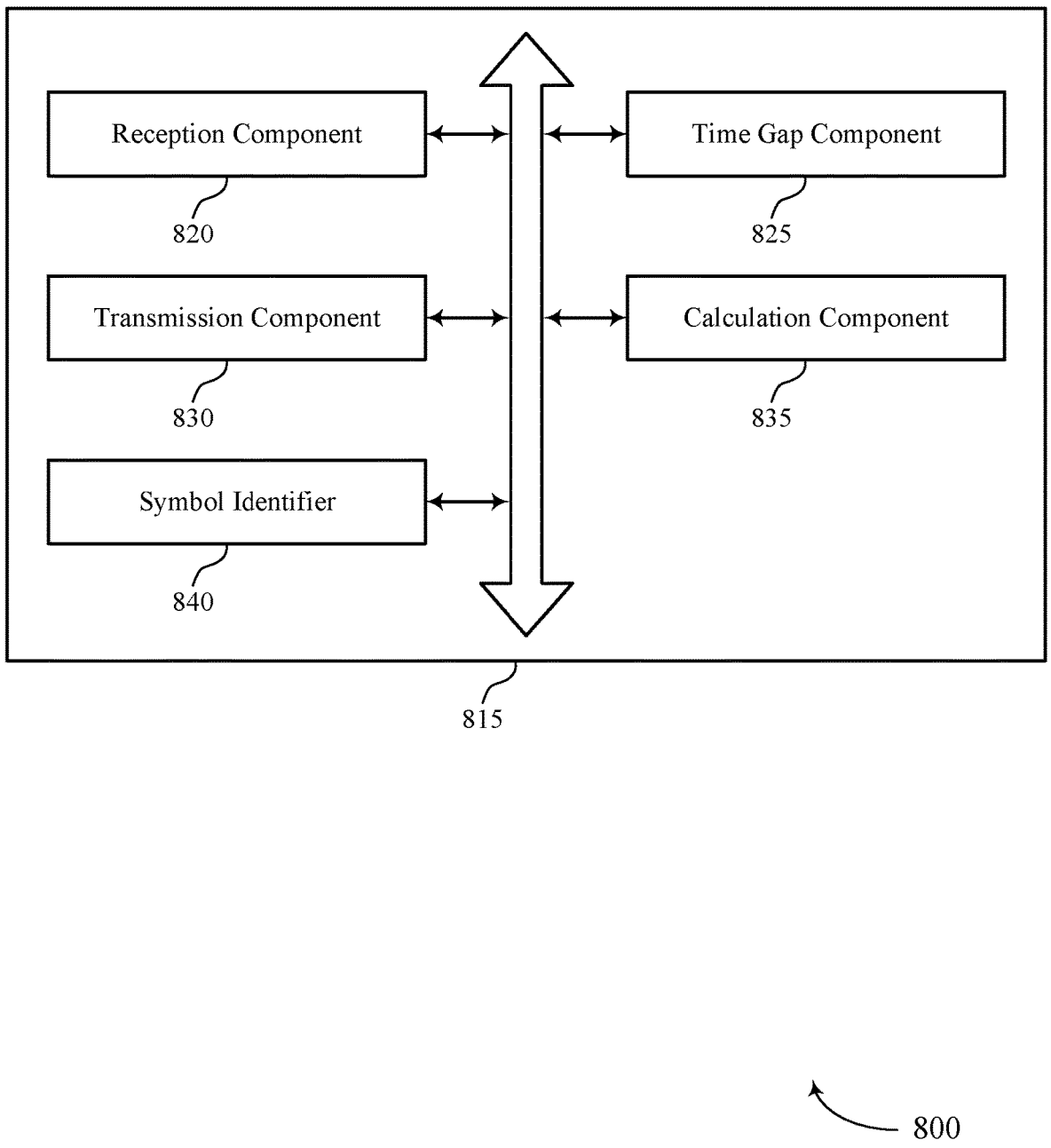

FIG. 8 shows a block diagram 800 of a communications manager 815 that supports random access timeline and timing adjustment techniques in accordance with aspects of the present disclosure. The communications manager 815 may be an example of aspects of a communications manager 615, a communications manager 715, or a communications manager 915 described with reference to FIGS. 6, 7, and 9. The communications manager 815 may include reception component 820, time gap component 825, transmission component 830, calculation component 835, and symbol identifier 840. Each of these modules may communicate, directly or indirectly, with one another (e.g., via one or more buses).

Reception component 820 may receive, from a base station 105, a control channel message including an indication to perform a random access procedure. Reception component 820 may receive, from the base station 105, a message indicating a number of symbols corresponding to at least one of the downlink transmission decoding time, the uplink transmission preparation time, the layer 2 processing time, or a combination thereof. Reception component 820 may receive the control channel message according to the first numerology corresponding to a first SCS that is different from a second SCS associated with the second numerology.

Reception component 820 may receive, from a base station 105, a downlink message that indicates a TA command and receive the downlink message via a PDSCH. In some cases, the control channel message includes a PDCCH order. In some examples, the downlink message includes a MAC-CE that conveys the TA command.

Time gap component 825 may determine a minimum time gap for transmission of a random access preamble based on a downlink transmission decoding time, an uplink transmission preparation time, a layer 2 processing time, or a combination thereof. In some cases, time gap component 825 may determine a minimum time gap for transmission of a random access preamble based on an uplink transmission preparation time. Time gap component 825 may determine the minimum time gap based on a numerology and a number of symbols associated with the random access preamble. Time gap component 825 may determine the minimum time gap based on a minimum of the first number of symbols and the second number of symbols and determine the minimum time gap based on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

Time gap component 825 may determine a minimum time gap for transmission of a random access preamble based on a first numerology. Time gap component 825 may determine a minimum time gap for transmission of a time-adjusted uplink message based on a downlink transmission decoding time, an uplink transmission preparation time, a layer 2 processing time, or a combination thereof, and determine the minimum time gap based on a summation of the downlink transmission decoding time, the uplink transmission preparation time, and the layer 2 processing time. In some cases, the layer 2 processing time is associated with a MAC latency time.

Transmission component 830 may transmit the random access preamble to the base station 105 in response to the control channel message based on the minimum time gap. Transmission component 830 may transmit the random access preamble to the base station 105 after the minimum time gap. Transmission component 830 may transmit the random access preamble to the base station 105 in response to the control channel message based on the minimum time gap, where the random access preamble is transmitted with a second numerology different from the first numerology.

Transmission component 830 may transmit the time-adjusted uplink message to the base station 105 in response to the TA command based on the minimum time gap. Transmission component 830 may transmit the time-adjusted uplink message to the base station 105 after the minimum time gap and transmit an uplink message according to a previous time adjustment during the minimum time gap. In some cases, the second numerology is configured by a higher layer. In some examples, the second numerology is a default numerology. In some aspects, the default numerology is associated with an SCS of 15 kHz. In some aspects, the default numerology is band specific.

Calculation component 835 may calculate the downlink transmission decoding time based on a numerology associated with the control channel message, a numerology associated with data in a downlink bandwidth part of the control channel message, a numerology for the minimum time gap configured by a higher layer, or a default numerology. In some aspects, the default numerology is band specific.

Calculation component 835 may calculate the uplink transmission preparation time based on a numerology associated with the random access preamble, a numerology associated with data in an uplink bandwidth part of a channel used for the random access preamble, a numerology for the minimum time gap configured by a higher layer, or a default numerology. Calculation component 835 may determine that a transmission numerology for the random access preamble is undefined for calculation of the uplink transmission preparation time and select the default numerology for calculating the uplink transmission preparation time based on determining that the transmission numerology for the random access preamble is undefined.

Calculation component 835 may calculate the uplink transmission preparation time based on a numerology associated with the time-adjusted uplink message, a numerology associated with data in an uplink bandwidth part of a channel used for the time-adjusted uplink message, or a numerology for the minimum time gap configured by a higher layer. Calculation component 835 may determine that a transmission numerology for the time-adjusted uplink message is undefined for calculation of the uplink transmission preparation time and calculate the downlink transmission decoding time based on a numerology associated with the downlink message, a numerology associated with data in a downlink bandwidth part of the downlink message, or a numerology for the minimum time gap configured by a higher layer.

Symbol identifier 840 may identify a first number of symbols based on a first numerology associated with the downlink transmission decoding time and identify a second number of symbols based on a second numerology associated with the uplink transmission preparation time. Symbol identifier 840 may identify a first time duration based at least in part on a first numerology associated with the downlink transmission decoding time and identify a second time duration based at least in part on a second numerology associated with the uplink transmission preparation time.

Time gap component 825 may determine the minimum time gap based at least in part on a maximum of the first time duration and the second time duration.

Figure 9:
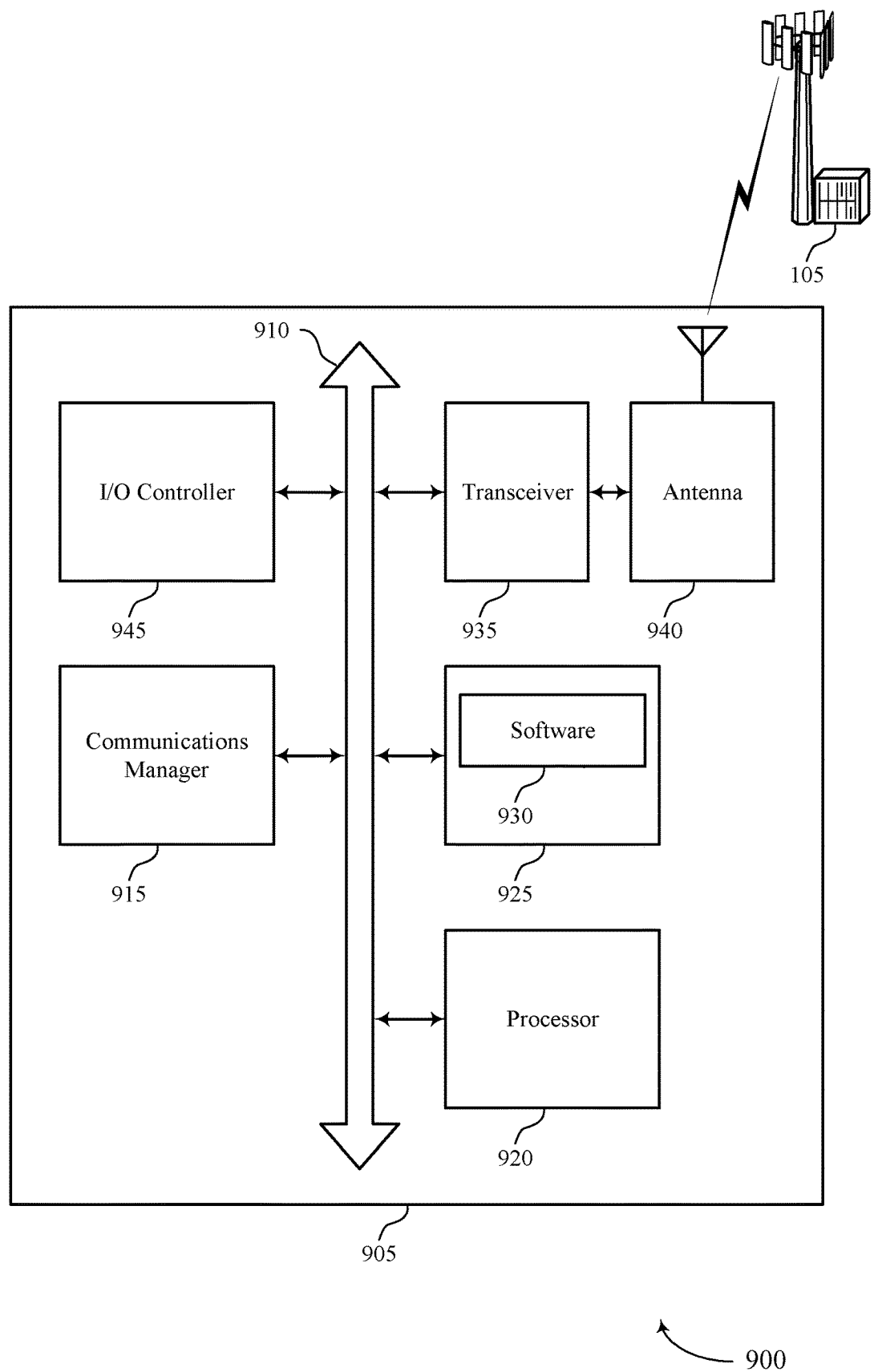
FIG. 9 illustrates a block diagram of a system including a user equipment (UE) that supports random access timeline and timing adjustment techniques in accordance with aspects of the present disclosure.

FIG. 9 shows a diagram of a system 900 including a device 905 that supports random access timeline and timing adjustment techniques in accordance with aspects of the present disclosure. Device 905 may be an example of or include the components of wireless device 605, device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA or other programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting random access timeline and timing adjustment techniques).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic I/O system (BIOS) which may control basic hardware or software operation such as the interaction with peripheral components or devices.

Software 930 may include code to implement aspects of the present disclosure, including code to support random access timeline and timing adjustment techniques. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the device 905 may include a single antenna 940, or the device 905 may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
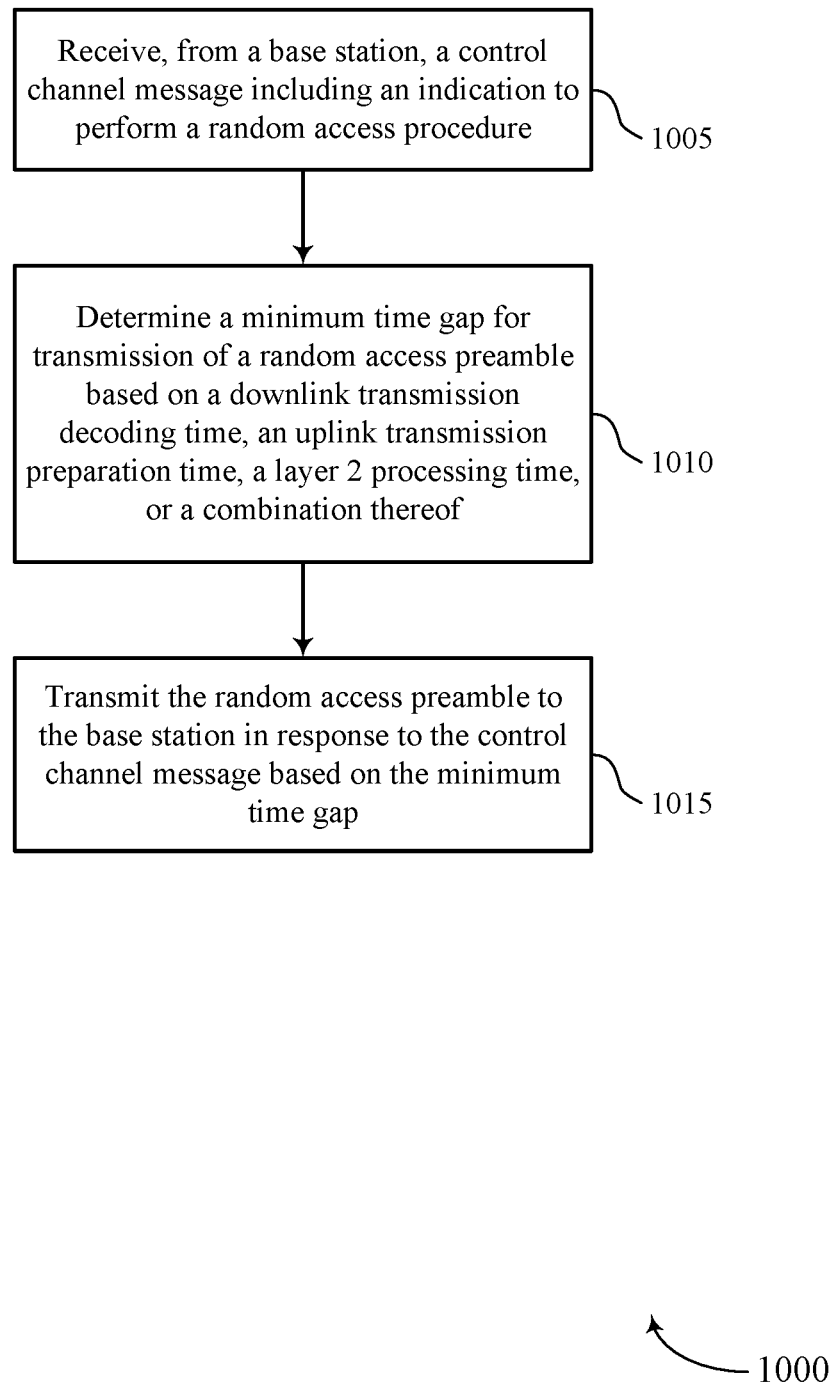
FIGS. 10 through 14 illustrate methods for random access timeline and timing adjustment techniques in accordance with aspects of the present disclosure.

FIG. 10 shows a flowchart illustrating a method 1000 for random access timeline and timing adjustment techniques in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1005, the UE 115 may receive, from a base station 105, a control channel message including an indication to perform a random access procedure. The operations of 1005 may be performed according to the methods described herein. In certain examples, aspects of the operations of 1005 may be performed by a reception component as described with reference to FIGS. 6 through 9.

At 1010, the UE 115 may determine a minimum time gap for transmission of a random access preamble based at least in part on a downlink transmission decoding time, an uplink transmission preparation time, a layer 2 processing time, or a combination thereof. The operations of 1010 may be performed according to the methods described herein. In certain examples, aspects of the operations of 1010 may be performed by a time gap component as described with reference to FIGS. 6 through 9.

At 1015, the UE 115 may transmit the random access preamble to the base station 105 in response to the control channel message based at least in part on the minimum time gap. The operations of 1015 may be performed according to the methods described herein. In certain examples, aspects of the operations of 1015 may be performed by a transmission component as described with reference to FIGS. 6 through 9.

Figure 11:
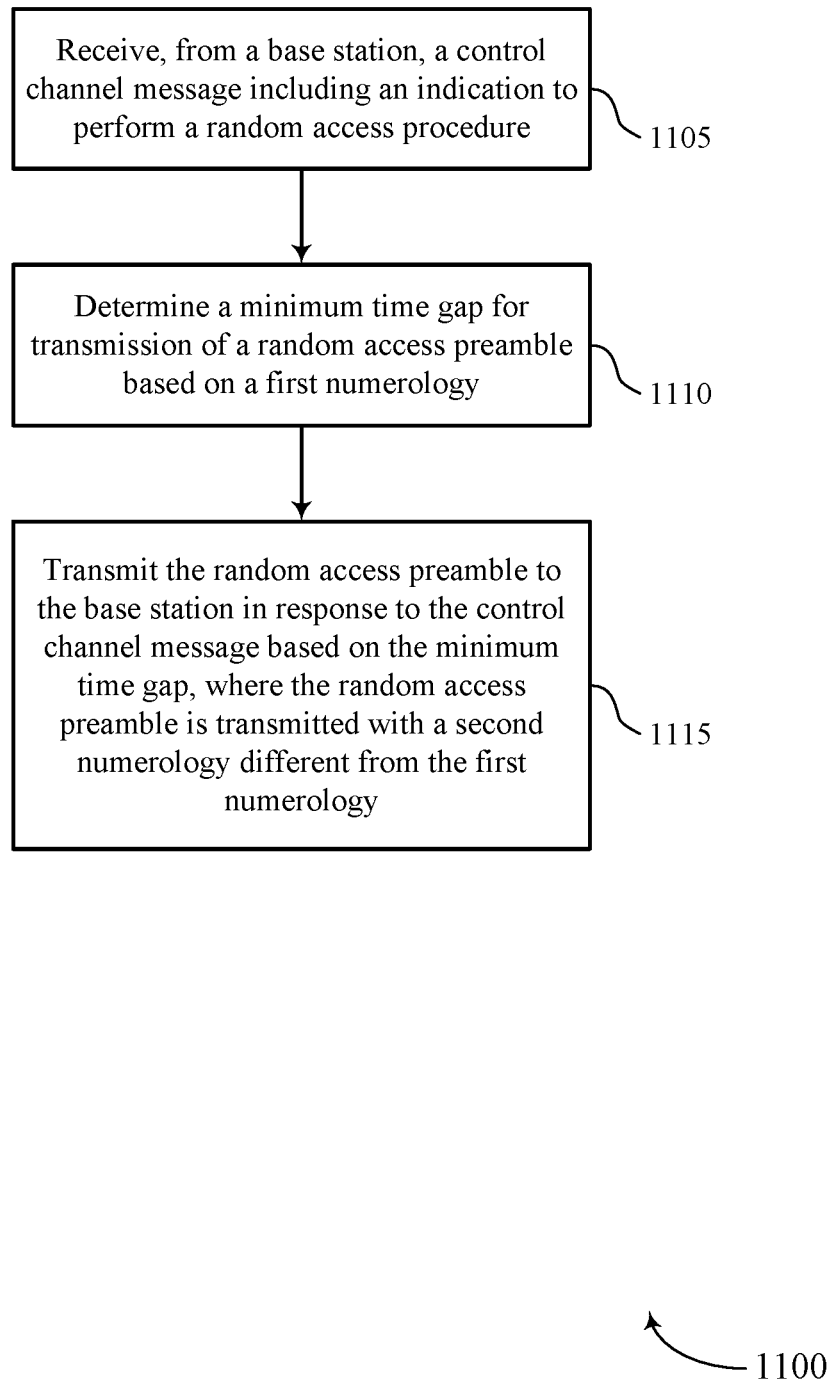

FIG. 11 shows a flowchart illustrating a method 1100 for random access timeline and timing adjustment techniques in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1105, the UE 115 may receive, from a base station 105, a control channel message including an indication to perform a random access procedure. The operations of 1105 may be performed according to the methods described herein. In certain examples, aspects of the operations of 1105 may be performed by a reception component as described with reference to FIGS. 6 through 9.

At 1110, the UE 115 may determine a minimum time gap for transmission of a random access preamble based at least in part on a first numerology. The operations of 1110 may be performed according to the methods described herein. In certain examples, aspects of the operations of 1110 may be performed by a time gap component as described with reference to FIGS. 6 through 9.

At 1115, the UE 115 may transmit the random access preamble to the base station in response to the control channel message based at least in part on the minimum time gap, where the random access preamble is transmitted with a second numerology different from the first numerology. The operations of 1115 may be performed according to the methods described herein. In certain examples, aspects of the operations of 1115 may be performed by a transmission component as described with reference to FIGS. 6 through 9.

Figure 12:
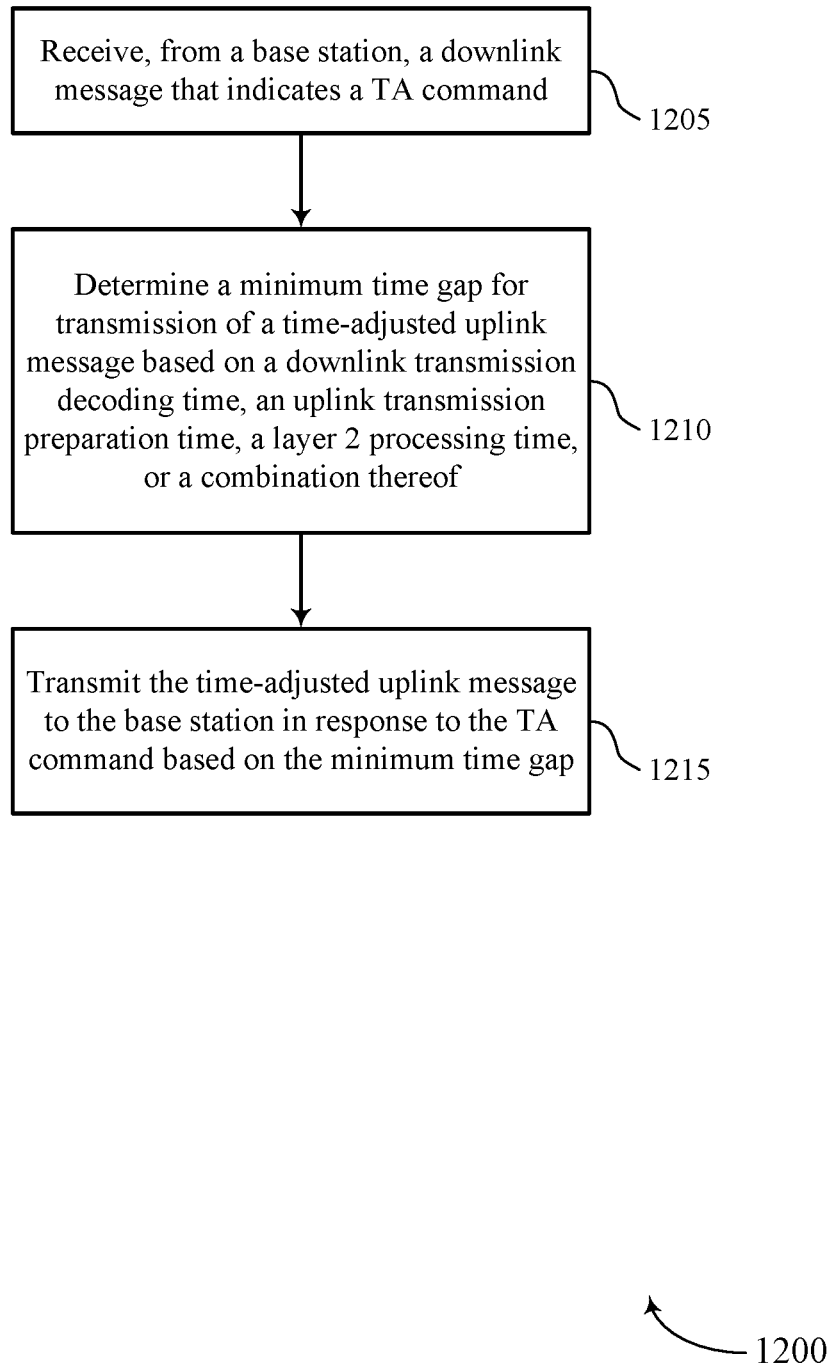

FIG. 12 shows a flowchart illustrating a method 1200 for random access timeline and timing adjustment techniques in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1205, the UE 115 may receive, from a base station 105, a downlink message that indicates a TA command. The operations of 1205 may be performed according to the methods described herein. In certain examples, aspects of the operations of 1205 may be performed by a reception component as described with reference to FIGS. 6 through 9.

At 1210, the UE 115 may determine a minimum time gap for transmission of a time-adjusted uplink message based at least in part on a downlink transmission decoding time, an uplink transmission preparation time, a layer 2 processing time, or a combination thereof. The operations of 1210 may be performed according to the methods described herein. In certain examples, aspects of the operations of 1210 may be performed by a time gap component as described with reference to FIGS. 6 through 9.

At 1215, the UE 115 may transmit the time-adjusted uplink message to the base station 105 in response to the TA command based at least in part on the minimum time gap. The operations of 1215 may be performed according to the methods described herein. In certain examples, aspects of the operations of 1215 may be performed by a transmission component as described with reference to FIGS. 6 through 9.

Figure 13:
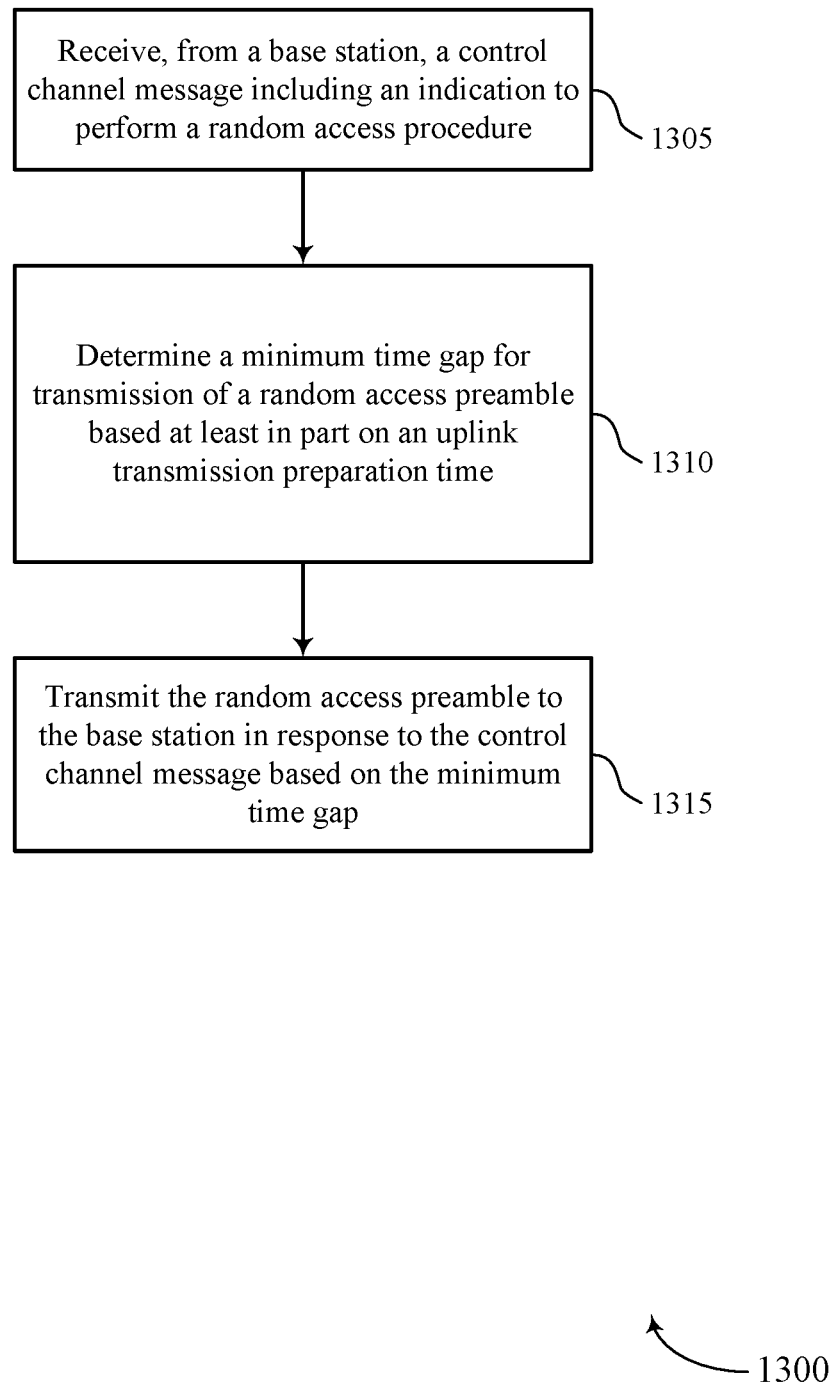

FIG. 13 shows a flowchart illustrating a method 1300 for random access timeline and timing adjustment techniques in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may receive, from a base station 105, a control channel message including an indication to perform a random access procedure. The operations of 1305 may be performed according to the methods described herein. In certain examples, aspects of the operations of 1305 may be performed by a reception component as described with reference to FIGS. 6 through 9.

At 1310, the UE 115 may determine a minimum time gap for transmission of a random access preamble based at least in part on an uplink transmission preparation time. The operations of 1310 may be performed according to the methods described herein. In certain examples, aspects of the operations of 1310 may be performed by a time gap component as described with reference to FIGS. 6 through 9.

At 1315, the UE 115 may transmit the random access preamble to the base station 105 in response to the control channel message based at least in part on the minimum time gap. The operations of 1315 may be performed according to the methods described herein. In certain examples, aspects of the operations of 1315 may be performed by a transmission component as described with reference to FIGS. 6 through 9.

Figure 14:
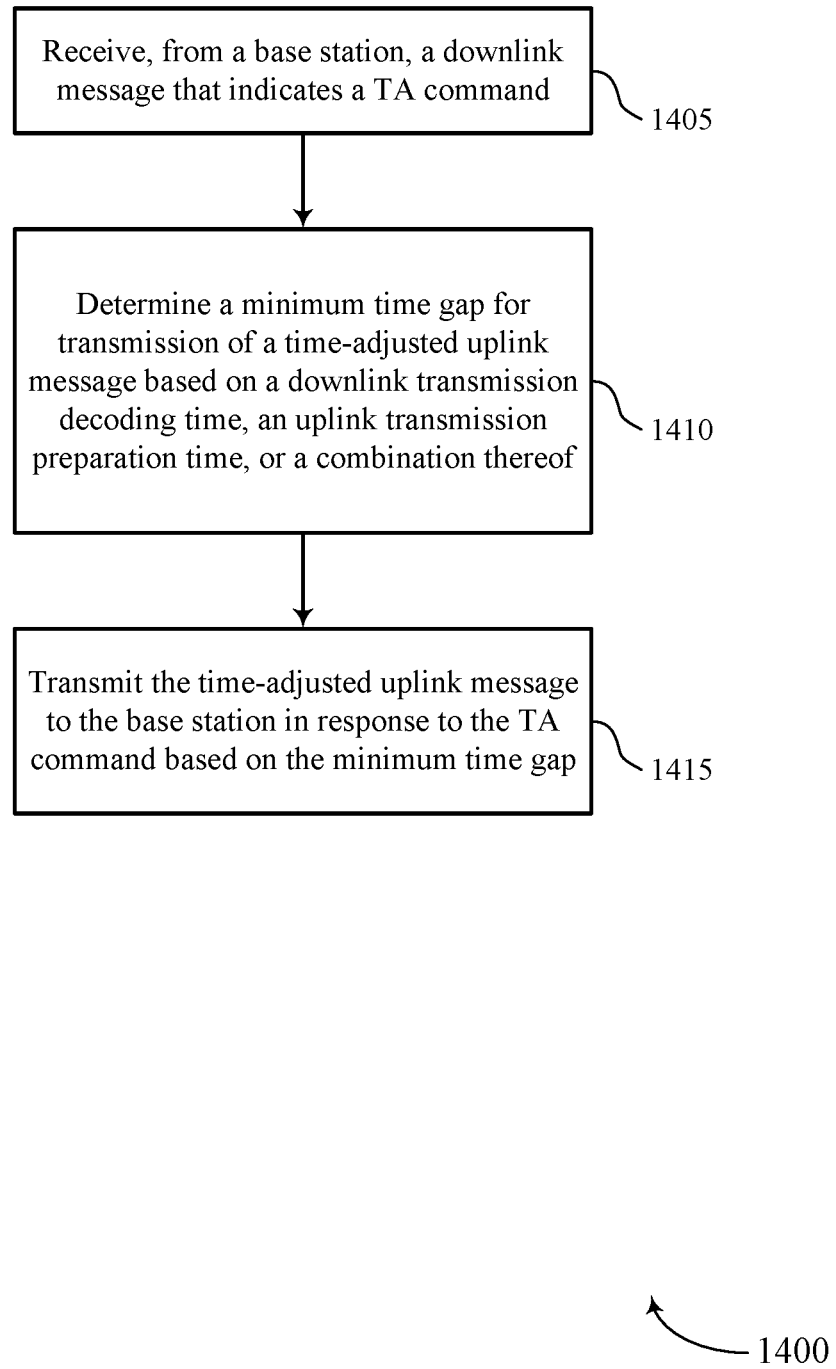

FIG. 14 shows a flowchart illustrating a method 1400 for random access timeline and timing adjustment techniques in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive, from a base station 105, a downlink message that indicates a TA command. The operations of 1405 may be performed according to the methods described herein. In certain examples, aspects of the operations of 1405 may be performed by a reception component as described with reference to FIGS. 6 through 9.

At 1410, the UE 115 may determine a minimum time gap for transmission of a time-adjusted uplink message based at least in part on a downlink transmission decoding time, an uplink transmission preparation time, or a combination thereof. The operations of 1410 may be performed according to the methods described herein. In certain examples, aspects of the operations of 1410 may be performed by a time gap component as described with reference to FIGS. 6 through 9.

At 1415, the UE 115 may transmit the time-adjusted uplink message to the base station 105 in response to the TA command based at least in part on the minimum time gap. The operations of 1415 may be performed according to the methods described herein. In certain examples, aspects of the operations of 1415 may be performed by a transmission component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving at a user equipment, from a base station, a control channel message comprising an indication to perform a random access procedure;
   determining at the user equipment a minimum time gap for transmission of a random access preamble based at least in part on an uplink transmission preparation time;
   calculating at the user equipment an uplink transmission preparation time based at least in part on a numerology associated with the random access preamble, a numerology associated with data in an uplink bandwidth part of a channel used for the random access preamble, a numerology for the minimum time gap configured by a higher layer, or a default numerology, wherein the default numerology is associated with a subcarrier spacing of 15 kilohertz (kHz) and is band specific;
   transmitting from the user equipment the random access preamble to the base station in response to the control channel message based at least in part on the minimum time gap.

2. The method of claim 1, further comprising:
   determining at the user equipment the minimum time gap based solely on the uplink transmission preparation time.

3. The method of claim 1, further comprising:
   determining at the user equipment the minimum time gap based at least in part on a downlink transmission decoding time, a layer 2 processing time, or a combination thereof; and
   calculating at the user equipment the downlink transmission decoding time based at least in part on a numerology associated with the control channel message, a numerology associated with data in a downlink bandwidth part of the control channel message, a numerology for the minimum time gap configured by a higher layer, or a default numerology.

4. The method of claim 1, further comprising:
   determining at the user equipment that a transmission numerology for the random access preamble is undefined for calculation of the uplink transmission preparation time; and
   selecting at the user equipment the default numerology for calculating the uplink transmission preparation time based at least in part on determining that the transmission numerology for the random access preamble is undefined.

5. The method of claim 3, further comprising:
   identifying at the user equipment a first time duration based at least in part on a first numerology associated with the downlink transmission decoding time;
   identifying at the user equipment a second time duration based at least in part on a second numerology associated with the uplink transmission preparation time; and
   determining at the user equipment the minimum time gap based at least in part on a maximum of the first time duration and the second time duration.

6. The method of claim 3, further comprising:
   identifying at the user equipment a first number of symbols based at least in part on a first numerology associated with the downlink transmission decoding time;
   identifying at the user equipment a second number of symbols based at least in part on a second numerology associated with the uplink transmission preparation time; and
   determining at the user equipment the minimum time gap based at least in part on a minimum of the first number of symbols and the second number of symbols.

7. The method of claim 3, further comprising:
   determining at the user equipment the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or the layer 2 processing time.

8. The method of claim 6, further comprising:
receiving at the user equipment, from the base station, a message indicating a number of symbols corresponding to at least one of a downlink transmission decoding time, the uplink transmission preparation time, a layer 2 processing time, or a combination thereof.

9. The method of claim 6, further comprising:
transmitting from the user equipment the random access preamble to the base station after the minimum time gap.

10. The method of claim 3, wherein the layer 2 processing time is associated with a medium access control (MAC) latency time.

11. The method of claim 6, wherein the control channel message comprises a physical downlink control channel (PDCCH) order.

12. A method for wireless communications, comprising:
receiving at a user equipment, from a base station, a control channel message comprising an indication to perform a random access procedure;
determining at the user equipment a minimum time gap for transmission of a random access preamble based at least in part on a first numerology
calculating at the user equipment an uplink transmission preparation time based at least in part on a numerology associated with the random access preamble, a numerology associated with data in an uplink bandwidth part of a channel used for the random access preamble, a numerology for the minimum time gap configured by a higher layer, or a default numerology, wherein the default numerology is associated with a subcarrier spacing of 15 kilohertz (kHz) and is band specific;
transmitting from the user equipment the random access preamble to the base station in response to the control channel message based at least in part on the minimum time gap, wherein the random access preamble is transmitted with a second numerology different from the first numerology.

13. The method of claim 12, further comprising:
receiving at the user equipment the control channel message according to the first numerology corresponding to a first subcarrier spacing that is different from a second subcarrier spacing associated with the second numerology.

14. The method of claim 12, wherein the second numerology is configured by a higher layer.

15. The method of claim 12, wherein the second numerology is a default numerology and the default numerology is associated with a subcarrier spacing of 15 kilohertz (kHz) and is band specific.

16. The method of claim 12, wherein the control channel message comprises a physical downlink control channel (PDCCH) order.

17. A method for wireless communications, comprising:
receiving, from a base station, a downlink message that indicates a timing advance (TA) command;
determining a minimum time gap for transmission of a time-adjusted uplink message based at least in part on a downlink transmission decoding time, an uplink transmission preparation time, or a combination thereof;

identifying a first time duration based at least in part on a first numerology associated with the downlink transmission decoding time;
identifying a second time duration based at least in part on a second numerology associated with the uplink transmission preparation time; and
determining the minimum time gap based at least in part on a maximum of the first time duration and the second time duration
and
transmitting the time-adjusted uplink message to the base station in response to the TA command based at least in part on the minimum time gap.

18. A method for wireless communications, comprising:
receiving, from a base station, a downlink message that indicates a timing advance (TA) command;
determining a minimum time gap for transmission of a time-adjusted uplink message based at least in part on a downlink transmission decoding time, an uplink transmission preparation time, or a combination thereof;
determining the minimum time gap based at least in part on the downlink transmission decoding time, the uplink transmission preparation time, a combination of the downlink transmission decoding time and the uplink transmission preparation time, a maximum of the downlink transmission decoding time and the uplink transmission preparation time, a minimum of the downlink transmission decoding time and the uplink transmission preparation time, or a layer 2 processing time
and
transmitting the time-adjusted uplink message to the base station in response to the TA command based at least in part on the minimum time gap.

19. An apparatus for wireless communications, comprising:
a processor;
memory in electronic communication with the processor; and
instructions stored in the memory and executable by the processor to cause the apparatus to:
receive at a user equipment, from a base station, a control channel message comprising an indication to perform a random access procedure;
determine a minimum time gap for transmission of a random access preamble based at least in part on an uplink transmission preparation time;
calculate at the user equipment an uplink transmission preparation time based at least in part on a numerology associated with the random access preamble, a numerology associated with data in an uplink bandwidth part of a channel used for the random access preamble, a numerology for the minimum time gap configured by a higher layer, or a default numerology, wherein the default numerology is associated with a subcarrier spacing of 15 kilohertz (kHz) and is band specific;
transmit from the user equipment the random access preamble to the base station in response to the control channel message based at least in part on the minimum time gap.

* * * * *